United States Patent
Hugghins et al.

(10) Patent No.: US 10,137,471 B2
(45) Date of Patent: Nov. 27, 2018

(54) SYSTEMS FOR REINFORCING A MULTI-PANEL SUPPORT MAT

(71) Applicant: NEWPARK MATS & INTEGRATED SERVICES LLC, The Woodlands, TX (US)

(72) Inventors: Joel Hugghins, Brookshire, TX (US); Aaron Dugas, Carencro, LA (US); Christian Peter Holtkamp, Windsor (CA); Rade Pupovac, Tecumseh (CA); Peter Filice Hoeksma, Windsor (CA); Shawn Joseph Davidson, Essex (CA); Bryan Arthur Joseph Hickson, Essex (CA)

(73) Assignee: Newpark Mats & Integrated Services, LLC, The Woodlands, TX (US)

( * ) Notice: Subject to any disclaimer, the term of this patent is extended or adjusted under 35 U.S.C. 154(b) by 0 days.

(21) Appl. No.: 15/658,586

(22) Filed: Jul. 25, 2017

(65) Prior Publication Data

US 2018/0029066 A1 Feb. 1, 2018

Related U.S. Application Data

(60) Provisional application No. 62/367,327, filed on Jul. 27, 2016.

(51) Int. Cl.
*B05C 5/02* (2006.01)
*B05C 11/10* (2006.01)
(Continued)

(52) U.S. Cl.
CPC .......... *B05C 5/0225* (2013.01); *B05C 5/0291* (2013.01); *B05C 11/1002* (2013.01); *B05C 11/1005* (2013.01); *B05C 11/1013* (2013.01); *B05C 11/1015* (2013.01); *B05D 1/265* (2013.01); *B29C 47/00* (2013.01); *B29C 65/4815* (2013.01); *B29C 65/525* (2013.01); *B29C 66/112* (2013.01); *B29C 66/435* (2013.01); *B29C 66/9221* (2013.01); *B29C 66/92441* (2013.01); *B29C 66/932* (2013.01); *B29C 66/93441* (2013.01); *B29C 65/40* (2013.01); *B29C 65/562* (2013.01);
(Continued)

(58) Field of Classification Search
None
See application file for complete search history.

(56) References Cited

U.S. PATENT DOCUMENTS 2,926,723 A * 3/1960 Clark ...................... B29C 65/40
118/302
5,857,589 A * 1/1999 Cline .................... B01F 5/0615
222/1
(Continued)

FOREIGN PATENT DOCUMENTS

EP 0367861 A1 5/1990
KR 10-1490318 B1 2/2015

*Primary Examiner* — Jethro M. Pence
(74) *Attorney, Agent, or Firm* — E. Randall Smith; E. Randall Smith, P.C.

(57) ABSTRACT

Systems useful for reinforcing a support mat over at least one seam formed between upper and lower panels of the mat include at least one extruder configured to apply weld-forming material over the seam(s) to form at least one weld atop the seam(s) and at least one electronic controller associated with the extruder.

38 Claims, 19 Drawing Sheets

(51) Int. Cl.
  *B29C 65/48* (2006.01)
  *B29C 65/52* (2006.01)
  *B29C 65/00* (2006.01)
  *B05D 1/26* (2006.01)
  *B29C 47/00* (2006.01)
  *B29L 7/00* (2006.01)
  *E01C 9/08* (2006.01)
  *B29C 65/40* (2006.01)
  *B29C 65/56* (2006.01)
  *B29C 65/78* (2006.01)
  *B29L 31/00* (2006.01)

(52) U.S. Cl.
  CPC ....... *B29C 65/7841* (2013.01); *B29C 66/1122* (2013.01); *B29C 66/137* (2013.01); *B29C 66/21* (2013.01); *B29C 66/24244* (2013.01); *B29C 66/41* (2013.01); *B29C 66/836* (2013.01); *B29C 66/863* (2013.01); *B29C 66/961* (2013.01); *B29L 2007/002* (2013.01); *B29L 2031/7324* (2013.01); *E01C 9/086* (2013.01)

(56) References Cited

U.S. PATENT DOCUMENTS

| | | | |
|---|---|---|---|
| 6,695,527 B2 | 2/2004 | Seaux et al. | |
| 8,561,415 B2 | 10/2013 | Fontaine et al. | |
| 2003/0084844 A1* | 5/2003 | Yamauchi | B05C 5/0216 118/663 |
| 2005/0241576 A1* | 11/2005 | Gaon | B05B 12/084 118/665 |
| 2008/0248193 A1* | 10/2008 | Nakatsuji | B05C 11/1002 427/96.2 |
| 2009/0107961 A1 | 4/2009 | Zaffino et al. | |
| 2013/0048759 A1* | 2/2013 | Aguilar | B05C 5/0225 239/562 |
| 2013/0264773 A1 | 10/2013 | McDowell | |
| 2014/0263688 A1* | 9/2014 | Doyle | B05C 5/0225 239/1 |
| 2014/0346253 A1* | 11/2014 | Ikushima | F04B 17/044 239/337 |
| 2016/0200024 A1 | 7/2016 | Kim et al. | |

* cited by examiner

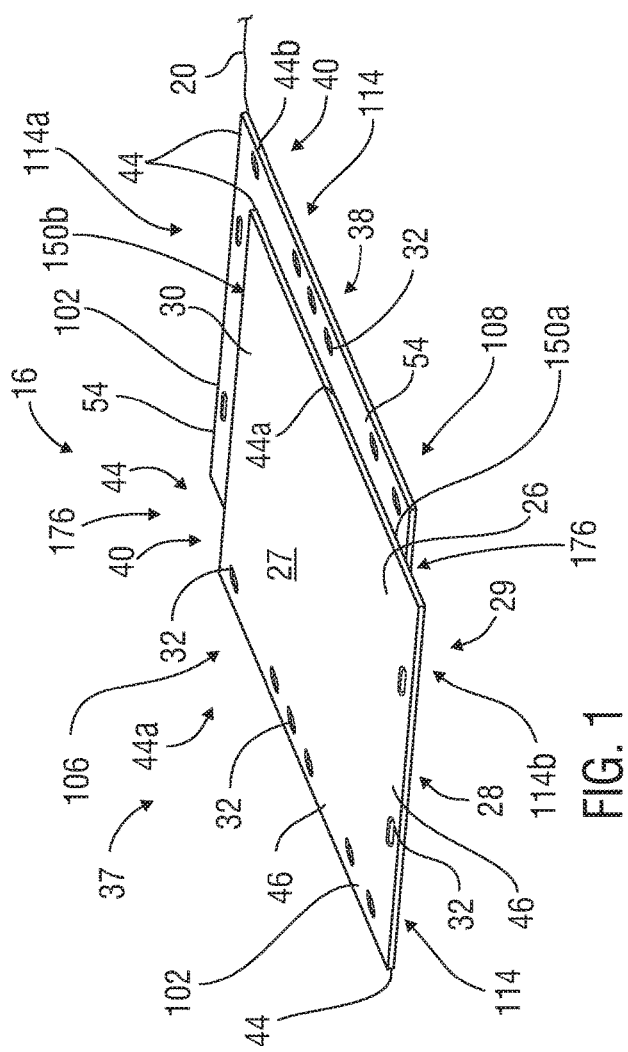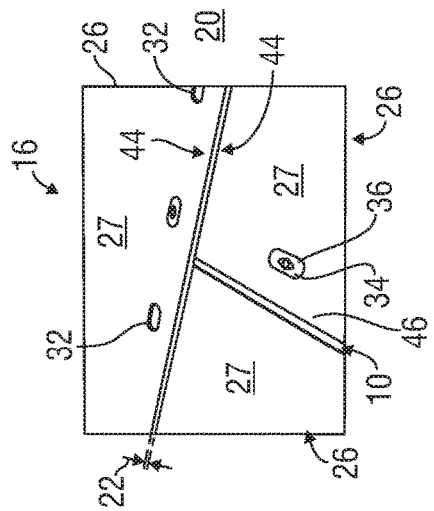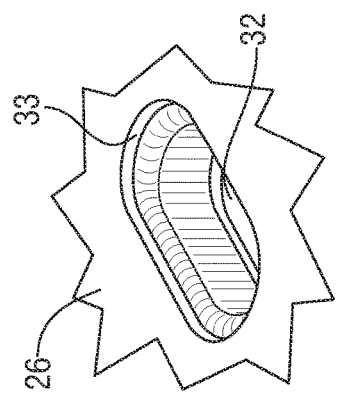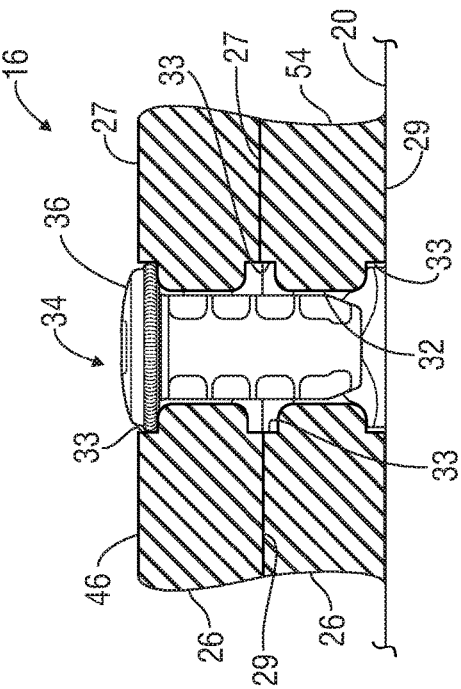

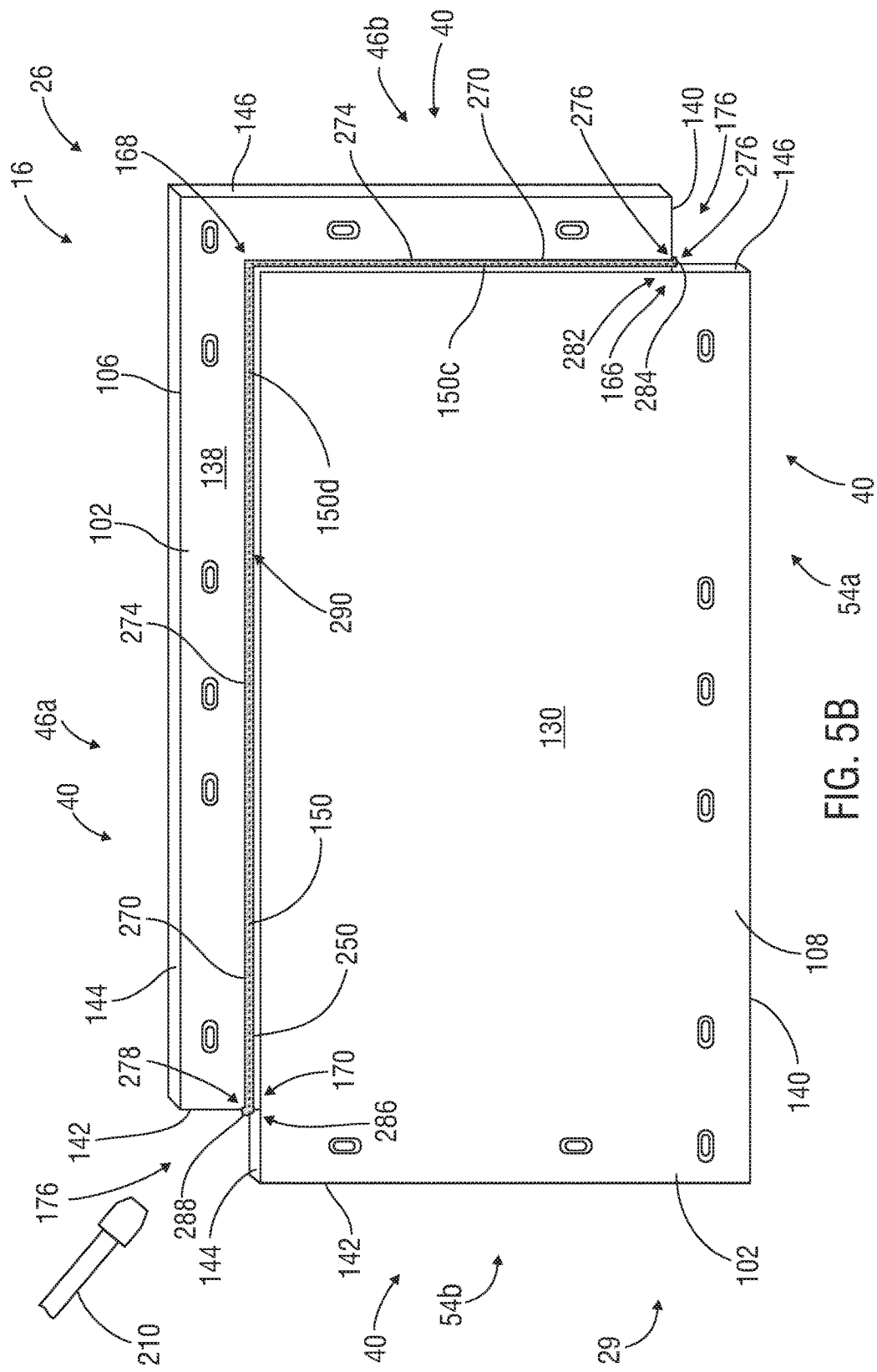

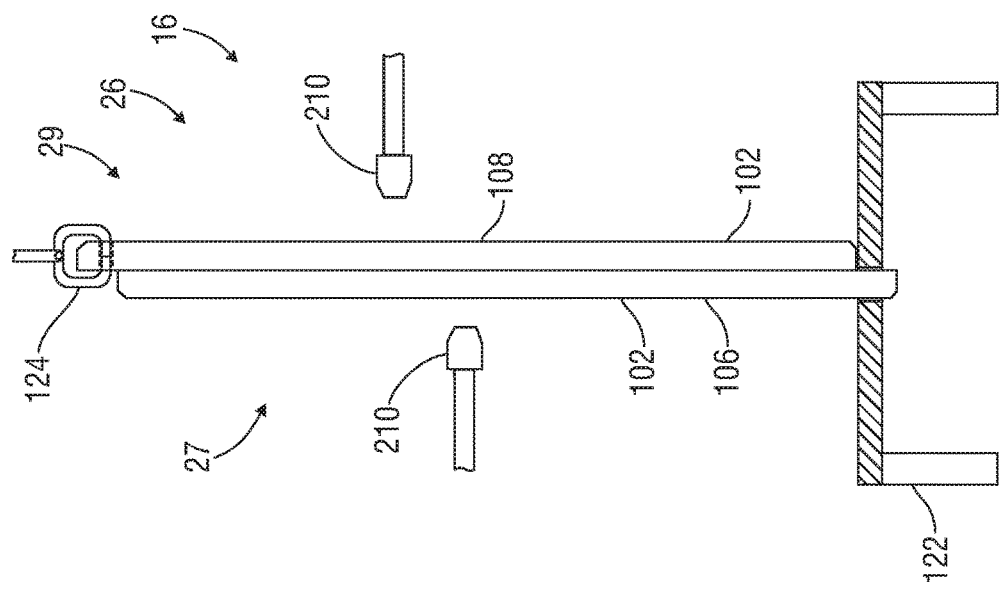
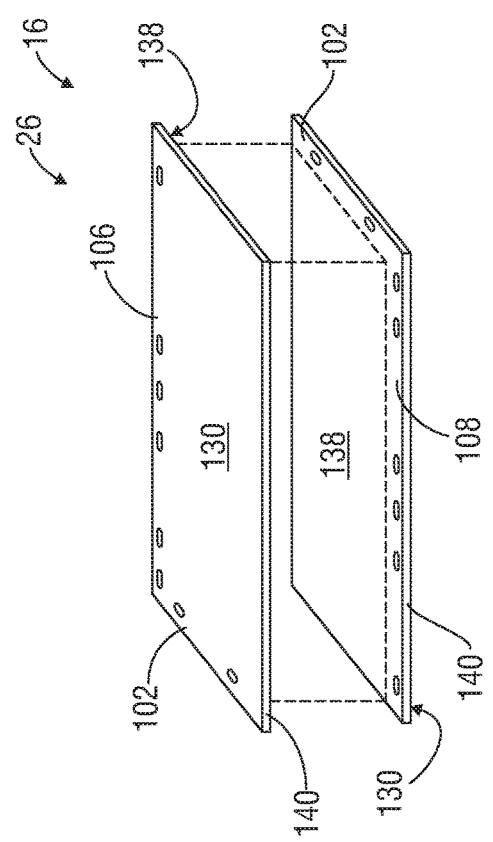

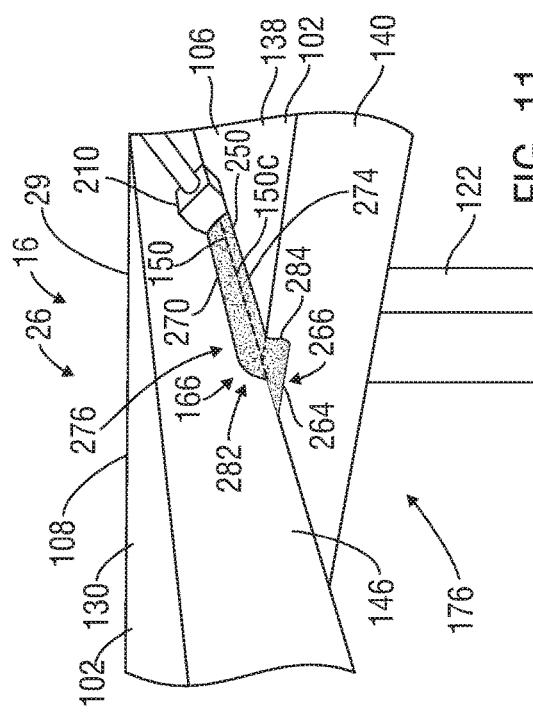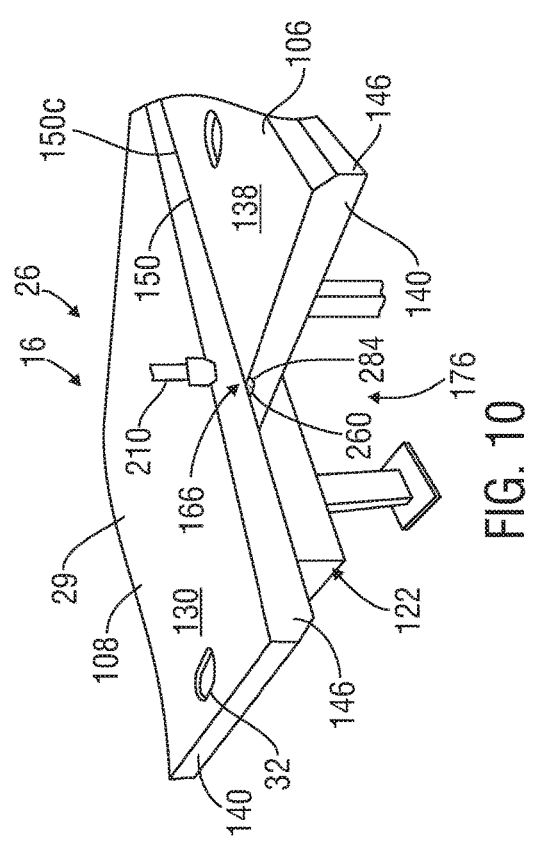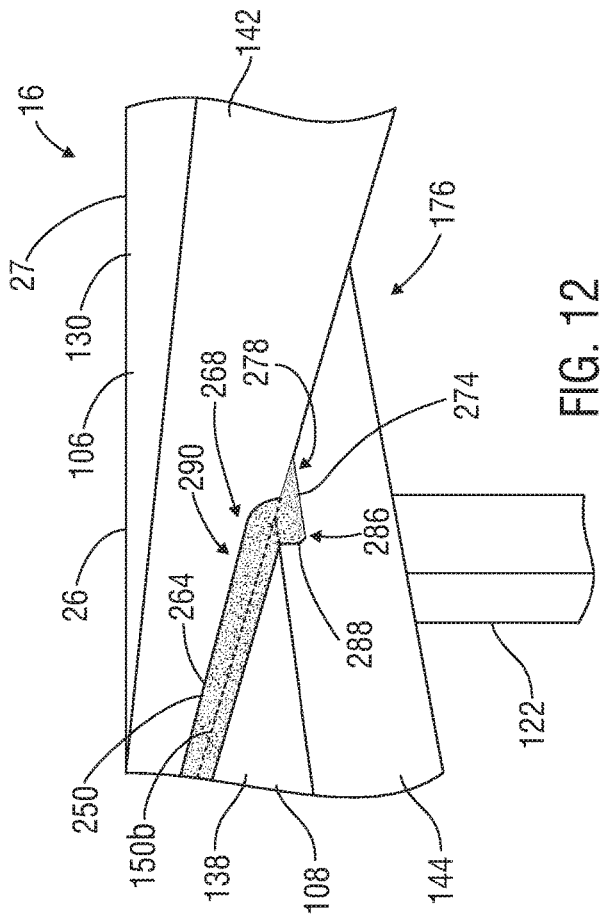

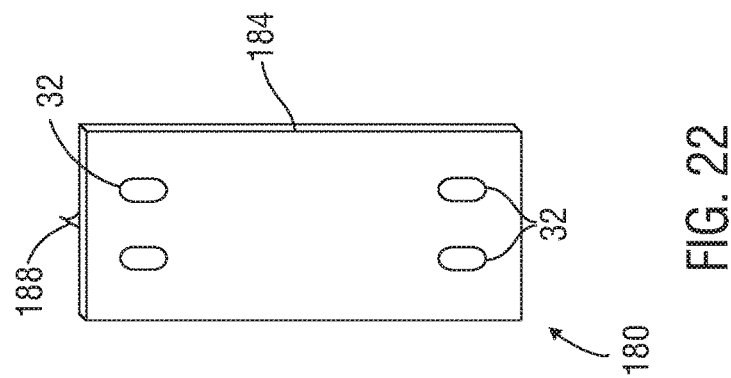
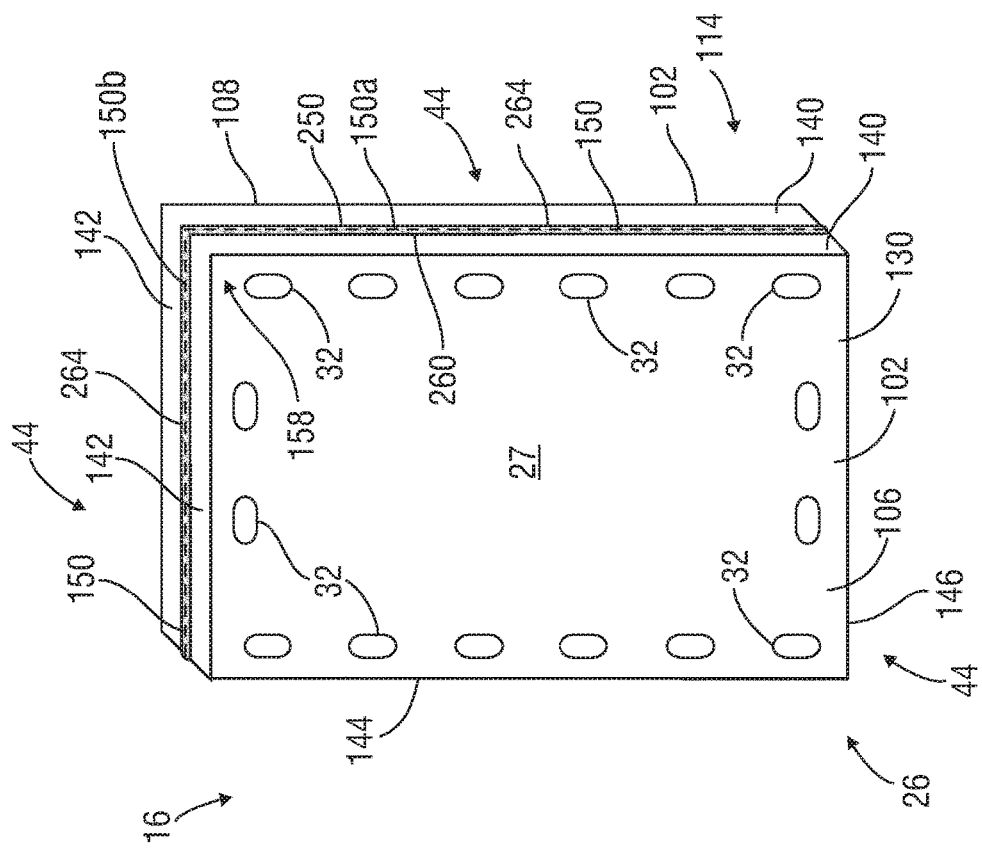

SYSTEMS FOR REINFORCING A MULTI-PANEL SUPPORT MAT

The present application claims priority to U.S. Provisional Patent Application Ser. No. 62/367,327 filed on Jul. 27, 2016 And Entitled "Apparatus, Systems and Methods for Reinforcing a Multi-Panel Load Supporting Mat", which is hereby incorporated by reference herein in its entirety.

FIELD OF THE DISCLOSURE

The present disclosure relates generally apparatus, systems and methods for reinforcing a multi-panel support mat and, in some embodiments, to apparatus, systems and methods for reinforcing at least one seam formed between one or more panels of a multi-panel support mat.

BACKGROUND

Support surfaces, or mats, are commonly used for roadways, remote jobsites, industrial staging areas, spill containment areas and/or other purposes in an ever-increasing myriad of industries, such as construction, military, energy (e.g. pipeline, oilfield, etc.), mining, chemical, transportation, disaster response, utilities and entertainment. In many instances, the support mats may be used in weight-bearing scenarios and/or may be subject to any among a variety of stresses and/or weather conditions.

To help provide sufficiently strong, durable, long-lasting or weather-resistant support mats, it is often desirable and/or important to reinforce the mat during the manufacturing process or thereafter. For example, some varieties of support mats are constructed of multiple sections, or panels. In many instances, it may be beneficial to reinforce such mats over and/or proximate to seams formed between the different sections, or panels, of the mat. Reinforcing a multi-panel mat over or proximate to the seam(s) formed between adjacent sections, or panels, may, for example, strengthen the mat at or near the reinforced location, enhance the overall strength and integrity of the mat, provide a substantially or entirely fluid-tight seal at the reinforced location, enhance or improve the aesthetic appearance of the mat, a combination thereof or any other purpose.

It should be understood that the above-described examples, features and capabilities are provided for illustrative purposes only and are not intended to limit the scope or subject matter of this disclosure, the appended claims or those of any related patent application or patent. Thus, none of the appended claims or claims of any related application or patent should be limited by the above discussion or construed to address, include or exclude each or any of the above-cited features or capabilities merely because of the mention thereof herein.

Accordingly, there exists a need for improved systems, articles and methods useful for reinforcing multi-panel support mats having one or more of the attributes or capabilities described or shown in, or as may be apparent from, the other portions of this patent.

BRIEF SUMMARY OF THE DISCLOSURE

In various embodiments, the present disclosure involves systems useful for reinforcing a support mat over at least one seam formed between upper and lower panels of the mat. The system includes at least one extruder configured to apply weld-forming material over the seam(s) to form at least one weld atop the seam(s). At least one electronic controller is associated with the extruder and configured to control and vary the rate and/or quantity of output of weld-forming material from the extruder(s). At least one measuring instrument is electronically coupled to the electronic controller and configured to emit a series of reflective signals onto the mat, retrieve at least some of the reflective signals and communicate data relating thereto to the electronic controller. At least one force sensor is associated with the extruder and electronically coupled to the electronic controller. The force sensor(s) is/are configured to measure one or more forces placed upon, or caused by, the extruder during use of the system and communicate data relating thereto to the electronic controller. The electronic controller is configured to determine whether corrective adjustments need to be made to the rate and/or quantity of output of weld-forming material from the extruder based at least partially upon data received from the measuring instrument(s) and/or the force sensor(s) and, if so, determine the desired corrective adjustment(s) and cause such corrective adjustment(s) to be made to the rate and/or quantity of output of weld-forming material from the extruder.

In many embodiments, the present disclosure involves a system for reinforcing a support mat over at least one seam formed between upper and lower panels of the mat. The system includes at least one extruder configured to apply weld-forming material over the at least one seam to form at least one weld atop the seam(s). Each extruder includes at least one screw configured to feed weld-forming material through the extruder to the mat. At least one servo-motor is coupled to the screw(s) and configured to selectively apply force to rotate the screw(s) and control the rate the screw(s) feed weld-forming material through the associated extruder. At least one electronic controller is associated with the servo-motor(s) and configured to dictate the amount of force applied to the screw(s) by the servo-motor to control the rate and/or quantity of output of weld-forming material from the extruder(s).

There are embodiments of the present disclosure that involve a system for providing a reinforcement weld over and/or proximate to at least one seam formed between upper and lower panels of a support mat. The system includes at least one extruder configured to apply weld-forming material over and/or proximate to the seam(s) to form at least one weld atop and/or proximate to the seam(s). At least one forming tool is positionable adjacent to the support mat and configured to assist in initiating or terminating the application of weld-forming material atop the seam(s) by the extruder and/or applying weld-forming material to the mat proximate to at least one seam by the extruder. Each forming tool includes a first cavity configured to form a first pocket between the forming tool and at least part of at least one of the panels and adjacent to the at least one seam. The first cavity is configured to form a first pocket with a geometry that accepts a desired quantity of weld-forming material from the extruder at the beginning or end of the application of weld-forming material over, and/or proximate to, at least one seam by the extruder.

In some embodiments, the present disclosure involves an automated system for providing a reinforcement weld over at least one seam formed between upper and lower panels of a support mat. The system includes at least one extruder configured to move along the mat and apply weld-forming material atop the seam(s) to form at least one weld atop the seam(s). At least one automated robot is configured to carry the extruder and control the movement and position of the extruder relative to the mat. At least one controller is electronically coupled to the robot and configured to direct the robot to position and move the extruder relative to the mat as desired and control the rate the extruder applies weld-forming material atop the at least one seam. At least one measuring instrument is electronically coupled to the controller. The at least one measuring instrument is configured to emit a series of reflective signals onto the mat and retrieve at least some of the reflective signals to measure at least one among the position of the extruder relative to the mat and one or more characteristics of the weld-forming material applied to the mat by the at least one extruder and communicate such data to the controller. The controller is configured to receive the data from the measuring instrument(s) and determine, based upon such data, whether the robot should make one or more corrective adjustments to at least one among the position of the extruder, the speed of movement the extruder and the rate of application of weld-forming material from the extruder to the mat and, if so, determine the desired corrective adjustment(s) and direct the robot to make such corrective adjustment(s).

There are embodiments involving an automated system for providing a reinforcement weld over at least one seam formed between upper and lower panels of a support mat. The system includes at least one extruder configured to apply weld-forming material over the seam(s) to form at least one weld atop the seam(s). At least one automated robot is configured to carry the extruder and control the rate the extruder applies weld-forming material atop the at least one seam. At least one controller is electronically coupled to the robot and configured to direct the robot to vary and/or maintain the rate the extruder applies weld-forming material atop the at least one seam. At least one force sensor is associated with the extruder and electronically coupled to the controller. The force sensor is configured to measure at least one among back-pressure resistance caused by the extruder and push and pull on the extruder during use of the system and communicate such data to the controller.

In select embodiments, the present disclosure involves an automated system for providing a reinforcement weld over at least one seam formed between upper and lower panels of a support mat. The system includes at least one extruder configured to move along the mat and apply weld-forming material atop the seam(s) of the mat to form at least one weld atop the seam(s). At least one automated robot is configured to carry the extruder and control the movement and position of the extruder relative to the mat. At least one controller is electronically coupled to the robot and configured to direct the robot to position and move the extruder relative to the mat as desired and control the rate the extruder applies weld-forming material atop the seam(s). At least one force sensor is associated with the extruder and electronically coupled to the controller. The force sensor is configured to measure at least one among back-pressure resistance caused by the extruder and push and pull on the extruder during use of the system and communicate such data to the controller. The controller is configured to receive the data from the force sensor and determine, based upon such data, whether the extruder is too close or far from the mat and/or dispensing too much or little weld-forming material as the extruder reinforces the mat and whether the robot needs to make corrective adjustments to at least one among the position of the extruder, the speed of movement the extruder and the rate of application of weld-forming material from the extruder to the mat and, if so, determine the corrective adjustment(s) and direct the robot to make such corrective adjustment(s).

In various embodiments, the present disclosure involves methods of reinforcing a support mat over or proximate to at least one top-side seam and at least one bottom-side seam formed between upper and lower interconnected panels of the mat. The mat includes a top and a bottom. The panels have similar or dissimilar shapes and dimensions. Each panel has an outer face, an inner face and at least two side edges. The panels at least partially overlap one another so that the inner faces of the upper and lower panels at least partially face and/or abut one another. Each top-side seam is formed between the upper and lower panels on the top of the mat and each bottom-side seam is formed between the panels on the bottom of the mat.

The methods of these embodiments include at least one extruder applying at least a first stream of weld-forming material over the top-side seam(s) to form a first weld atop the top-side seam(s) on the top of the mat. At least one extruder applies at least a second stream of weld-forming material over the bottom-side seam(s) to form a second weld atop the bottom-side seam(s) on the bottom of the mat. The first and second welds are each formed with a first end proximate to one another and a second end proximate to one another. While the extruder(s) are applying the first and second stream of weld-forming material over the top-side and bottom-side seams, at least one among back-pressure resistance caused by the extruder(s), push and pull on the extruder(s), the position of the extruder(s) relative to the mat, one or more characteristics of the weld-forming material applied to the mat by the extruder(s) are repeatedly measured. In response to measurements taken, an automated robot changes the position of at least one extruder, the speed of movement of at least one extruder relative to the mat, the speed of movement the mat relative to at least one extruder(s), the rate of application of weld-forming material from at least one extruder to the mat, or a combination thereof.

In some embodiments, the present disclosure involves automated methods of reinforcing a support mat over or proximate to at least four seams formed between upper and lower interconnected panels of the mat. The mat includes a top, a bottom and at least four sides. The panels have similar or dissimilar shapes and dimensions. Each panel includes an outer face, an inner face and at least four side edges. The panels at least partially overlap one another so that the inner faces of the upper and lower panels at least partially face and/or abut one another, and the first and second side edges of the lower panel and the third and fourth side edges of the upper panel extend beyond the corresponding adjacent side edges of the other panel, respectively, in each instance forming a distinct protruding lip that includes part of one panel bordered by a side edge of the other panel along each side of the mat. A seam is formed along the intersection of the respective side edge of each panel that forms the border of each protruding lip and the inner face of the other panel. First and second seams are formed between at least part of the first and second side edges of the upper panel and the inner face of the lower panel, respectively, and third and fourth seams are formed between at least part of the fourth and third side edges of the lower panel and the inner face of the upper panel.

The methods of these embodiments include at least one automated extruder applying at least a first stream of weld-forming material over the first and second seams to form a first linear weld atop the first and second seams. At least one automated extruder applies at least a second stream of weld-forming material over the third and fourth seams to form a second linear weld atop the third and fourth seams. The first and second linear welds each have a first end and a second end, respectively. At least one automated extruder applies weld-forming material on the fourth side edge of the lower panel and/or the first side edge of the upper panel adjacent to the intersection of the fourth side edge of the lower panel and the first side edge of the upper panel to form at least part of a first transition weld that will extend between and join together the first and second linear welds at the respective first ends thereof. At least one automated extruder applies weld-forming material on the third side edge of the lower panel and/or the second side edge of the upper panel adjacent to the intersection of the third side edge of the lower panel and the second side edge of the upper panel to form at least part of a second transition weld that will extend between and join together the first and second linear welds at the respective second ends thereof.

The present disclosure also includes embodiments of methods of reinforcing a load-supporting mat over or proximate to at least two seams formed between upper and lower interconnected panels of the mat. The mat includes a top, a bottom and at least two side edges. The panels have similar or dissimilar shapes and dimensions. Each panel has an outer face, an inner face and at least two side edges. The panels at least partially overlap one another so that the inner faces of the upper and lower panels at least partially face and/or abut one another, and first and second side edges of the upper panel align with the first and second side edges of the lower panel on the respective first and second side edges of the mat. A first seam is formed along the intersection of the first side edges of the upper and lower panels and a second seam is formed along the intersection of the second side edges of the panels, respectively. While moving relative to the mat, at least one robot-guided extruder applies at least a first stream of weld-forming material over the first and second seams to form a first linear weld atop the first and second seams of the mat. While the at least one extruder is moving and applying the first stream of weld-forming material over the first and second seams, at least one measuring instrument emits a series of reflective signals onto the mat at different locations on the mat and retrieves at least some of the reflective signals to measure at least one among the position of at least one extruder relative to the mat and one or more characteristics of the weld-forming material applied to the mat by at least one extruder. In response to the measurements received by the measuring instrument(s), the robot changes at least one among the position of at least one extruder, the speed of movement of at least one extruder and the rate of application of weld-forming material from at least one extruder to the mat.

The present disclosure also includes embodiments of methods of reinforcing a load-supporting mat over or proximate to at least two seams formed between upper and lower interconnected panels of the mat. The mat includes a top, a bottom and at least two side edges. The panels have similar or dissimilar shapes and dimensions. Each panel has an outer face, an inner face and at least two side edges. The panels at least partially overlap one another so that the inner faces of the upper and lower panels at least partially face and/or abut one another, and first and second side edges of the upper panel align with the first and second side edges of the lower panel on the respective first and second side edges of the mat. A first seam is formed along the intersection of the first side edges of the upper and lower panels and a second seam is formed along the intersection of the second side edges of the panels, respectively. While moving relative to the mat, at least one robot-guided extruder applies at least a first stream of weld-forming material over the first and second seams to form a first linear weld atop the first and second seams of the mat. While the at least one extruder is moving and applying the first stream of weld-forming material over the first and second seams, at least one force sensor measures at least one among back-pressure resistance caused by at least one extruder and push and pull on at least one extruder during use of the system. In response to the measurements received by the at least one force sensor, a robot changes at least one among the position of at least one extruder, the speed of movement at least one extruder and the rate of application of weld-forming material from at least one extruder to the mat.

Accordingly, the present disclosure includes features and advantages which are believed to enable it to advance multi-panel support mat technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 is a perspective view of an exemplary support mat useful in a support surface in accordance with one or more embodiments of the present disclosure;

FIG. 2 is a top view of a portion of an exemplary support surface useful in accordance with one or more embodiments of the present disclosure;

FIG. 3A is a perspective view of an exemplary hole in an exemplary mat;

FIG. 3B is a partial cross-sectional view of an exemplary locking pin shown engaged with two mats;

FIG. 5B is a bottom view of the exemplary mat shown in FIG. 5A;

FIG. 5C is a plan view of the mat shown in FIG. 5A before the mat is reinforced;

FIG. 7 is a side view of an exemplary mat to be reinforced in a vertical position in accordance with one or more embodiments of the present disclosure;

FIG. 10 is a perspective view showing part of the lower surface of the exemplary mat of FIG. 8 before application of an exemplary second stream of weld-forming material in accordance with one or more embodiments of the present disclosure;

FIG. 11 is a perspective view of the exemplary mat of FIG. 10 after the exemplary first transition weld has been completed and while the exemplary second stream of weld-forming material is being applied to the mat in accordance with one or more embodiments of the present disclosure;

FIG. 12 is a perspective view of the exemplary mat as shown in FIG. 9 taken after application of the exemplary first and second streams of weld-forming material to the mat and formation of the first and second transition welds in accordance with one or more embodiments of the present disclosure;

FIG. 21 is a perspective view of yet another embodiment of an exemplary support mat useful in accordance with one or more embodiments of the present disclosure;

FIG. 22 is a perspective view of an exemplary mating plate useful for connecting various embodiments of support mats in accordance with one or more embodiments of the present disclosure.

DETAILED DESCRIPTION OF PRESENTLY PREFERRED EMBODIMENTS

Figure 4A:
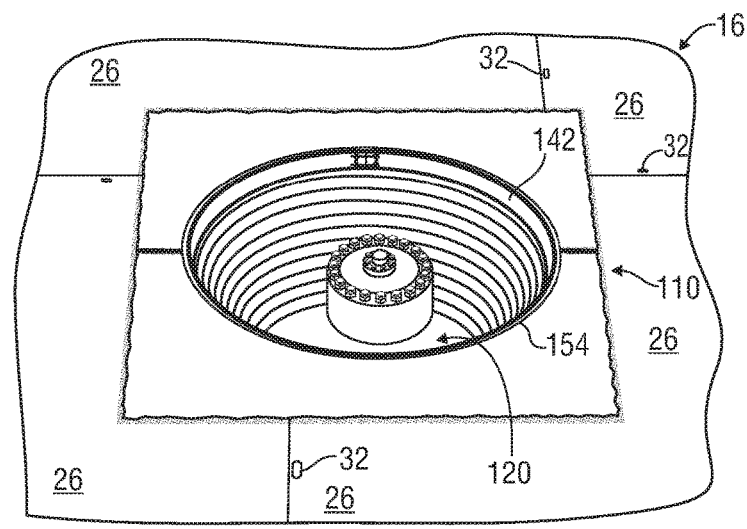
FIG. 4A is a perspective view of a borehole equipped with an embodiment of a borehole edge (e.g. cellar) seal system.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of this disclosure or any appended claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement, except and only to the extent as may be explicitly required in a particular claim hereof or in a patent claiming priority hereto and only for such claim(s) and any claim(s) depending therefrom. Thus, if a first device couples to a second device, that connection may be through a direct connection, or through an indirect connection via other devices and connections, except and only to the extent as may be explicitly required in a particular claim hereof or in a patent claiming priority hereto and only for such claim(s) and any claim(s) depending therefrom.

Certain terms are used herein and in the appended claims to refer to particular components. As one skilled in the art will appreciate, different persons may refer to a component by different names. The use of a particular or known term of art as the name of a component herein is not intended to limit that component to only the known or defined meaning of such term (e.g. bar, connector, rod, cover, panel, bolt). Further, this document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIGS. 1 and 2, an exemplary support surface 16 having at least one support, or load-supporting, mat 26 configured to be deployed on or near the ground 20 is shown. As used herein, the term "ground" and variations thereof mean the earth's surface, and/or one or more other surfaces, structures or areas proximate to or associated with the earth's surface. The support surface 16 and mats 26 may have any suitable form, construction, components, configuration and operation. In the illustrated embodiment, the support surface 16 includes at least two reusable, interconnectable, adjacent mats 26. However, mats 26 which are not reusable and/or interconnectable may likewise be used.

If desired, each exemplary mat 26 may be capable of supporting the weight of personnel, vehicles, equipment and/or other structures thereupon and moving thereacross. In some embodiments, the mats 26 may be heavy-duty, durable, all-weather and capable of supporting and withstanding substantial weight and forces placed thereupon in harsh outdoor environments and circumstances (e.g. to support heavy structures, equipment, wheeled and/or tracked vehicles and equipment at remote oilfield or hydrocarbon production, storage, and/or transportation sites, construction, military, transportation, disaster response, utilities or entertainment sites, etc.). In various embodiments, the mat 26 may weight approximately 1,000 lbs., be designed to withstand up to, or in some cases more than, 600 psi in pure crush pressure placed thereupon, reduce point-to-point ground pressure on the ground 20 that may be caused by wheeled and/or tracked vehicles on or moving across the mat 26 or a combination thereof. In various embodiments, the mats 26 may be 14'×8' DURA-BASE® mats currently sold by the Assignee of this patent application. A mat 26 having any of the features or capabilities mentioned in this paragraph is sometimes referred to as a "heavy load supporting" mat.

Some examples of mats 26 which may be used in various embodiments of the present disclosure are shown and described in in U.S. Pat. No. 5,653,551 to Seaux, entitled "Mat System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent application and the contents of which are hereby incorporated by reference herein in their entireties.

However, the present disclosure and multi-panel mat reinforcement systems 200 and methods herein may be used with mats 26 not having the above capabilities, specifications or features or as provided in the above-referenced patents. For example, the mats 26 may not be heavy-duty, durable, all-weather, capable of supporting the weight of personnel, vehicles, equipment and/or other structures thereupon or a combination thereof, and may be used in indoor locations. Thus, the terms "support mat", "load-supporting mat" and variations thereof means a mat capable of supporting any desired load and may or may not, depending upon the particular embodiment, include one or more of the features mentioned above or in the above-referenced patents.

If desired, the support surface 16 may be used in connection with any of the components and features described and shown in U.S. Pat. No. 9,132,996 issued on Sep. 15, 2015 to Robertson and entitled "Crane-Mounted Grab Head", U.S. Pat. No. 7,370,452 issued on May 13, 2008 to Rogers and entitled "Mat Assembly for Heavy Equipment Transit and Support", U.S. Pat. No. 9,039,325 issued on May 26, 2015 to McDowell and entitled "Liquid Containment System for Use with Support Surfaces", U.S. patent application Ser. No. 14/720,799, filed on May 24, 2015 and entitled "Liquid Containment System", U.S. Pat. No. 9,430,943 issued on Aug. 30, 2016 and entitled "Apparatus and Methods for Providing Illuminated Signals from a Support Surface", U.S. Pat. No. 9,337,586 issued on May 10, 2016 and entitled "Apparatus & Methods for Electrically Grounding a Load-Supporting Support Surface", U.S. patent application Ser. No. 15/178,254 filed on Jun. 9, 2016 and entitled "Apparatus and Methods for Electrically Grounding at Least one Mat in a Load-Supporting Surface", U.S. Pat. No. 9,368,918 issued on Jun. 14, 2016 and entitled "Apparatus and Methods for Electrically Grounding at Least one Mat in a Load-Supporting Surface", U.S. Pat. No. 9,297,124 issued on Mar. 29, 2016 and entitled "Methods of Moving at Least One Mat With a Crane-Mounted Grab Head", U.S. patent application Ser. No. 15/132,410, filed on Apr. 19, 2016 and entitled "Apparatus & Methods for Supporting One or More Upright Items from a Support Surface", U.S. patent application Ser. No. 15/484,857 filed on Apr. 11, 2017 and entitled "Apparatus, System and Methods for Providing Accessories on a Support Surface", as well as all related patents issuing from each of the applications mentioned above, each of which has a common Assignee as the present patent application and the contents of which are hereby incorporated by reference herein in their entireties.

Still referring to FIGS. 1 and 2, in the illustrated embodiment, each mat 26 has a top, or upper surface, 27, lower, or bottom, surface 29 and four sides 28, 30, 37 and 38. In other embodiments, the mat 26 may have more or less than four sides (e.g. two, three, five, six, seven, etc.). At least one outer, or side, edge 44 (e.g. edge 44a) extends along each side and around a perimeter 114 (e.g. perimeter 114a) of the exemplary mat 26. As used herein, the terms "edge" and variations thereof means a surface extending in a straight line, or along a path having curves or turns. In this example, the mat 26 is rectangular, formed of two sections, or panels, 102 (an upper panel 106 and lower panel 108), and has an opposing pair of short sides 28, 30 and an opposing pair of long sides 37, 38. The illustrated mat 26 thus has a first, upper, set of aligned edges 44a extending around an "upper" perimeter 114a (formed around the upper panel 106), and a second, lower, set of aligned edges 44b extending around a "lower" perimeter 114b (formed around the lower panel 108). However, in other embodiments, the mat 26 may be a single unitary item or a combination of more than two component parts (e.g. panels), may have only one, or more than two, perimeters 114 and/or any different overall shape (square, triangular, hexagonal, other geometric arrangement, etc.), or any desired combination thereof.

The exemplary mat 26 is also reversible. In other words, the top 27 and bottom 29 of the illustrated mat 26 are mirror images of one another, so either the top 27 or bottom 29 can be facing up or down. In other embodiments, the mats 26 may not be reversible.

In this example, the mat 26 has a stepped-configuration with one or more protruding lips 40. As used herein, the terms "stepped-configuration" and variations thereof mean the mat 26 has at least one portion, or protruding lip, that extends at least partially on a different plane than at least one other portion, and the planes are at least substantially parallel. As used herein, the terms "substantially", "generally" and variations thereof mean and includes (i) completely, or 100%, of the referenced parameter, variable or value, and (ii) a range of values less than 100% based upon the typical, normal or expected degree of variation or error for the referenced parameter, variable or value in the context of the particular embodiment or use thereof, such as, for example, 90-100%, 95-100% or 98-100%. The exemplary first short side 28 and first long side 37 of the mat 26 each have an upper lip 46 extending horizontally outwardly therefrom, which will typically be spaced above the ground 20. The illustrated second short side 30 and second long side 38 of the mat 26 each have a lower lip 54 extending horizontally outwardly therefrom, and which will typically rest on the ground 20. Thus, in this embodiment, two sets of aligned edges 44a, 44b are formed around the sides 28, 30, 37 and 38 of the mat 26. However, the present disclosure and the multi-panel mat reinforcement systems 200 and methods herein are not limited to stepped-configuration mats 26 or mats having upper and lower lips 46, 54 and may thus be used with mats 26 not having a stepped-configuration and/or upper and lower lips 46, 54, as well as mats having less or more than four lips (e.g. 1, 2, 3, 5, 6, etc.).

Referring still to FIGS. 1 & 2, many temporary or semi-permanent support surfaces have holes, or cavities, 32 formed in them. For example, support surfaces 16 made up of multiple mats, panels and/or other components often include connecting holes 32 formed therein. In some instances, the mats, panels and/or other components include holes 32 that can be aligned over or under those of adjacent mats/panels/components and through which removable locking pins 34 are inserted for connecting the mats/components together. These sorts of holes 32 are sometimes referred to herein as "locking pin" holes.

Figure 20:
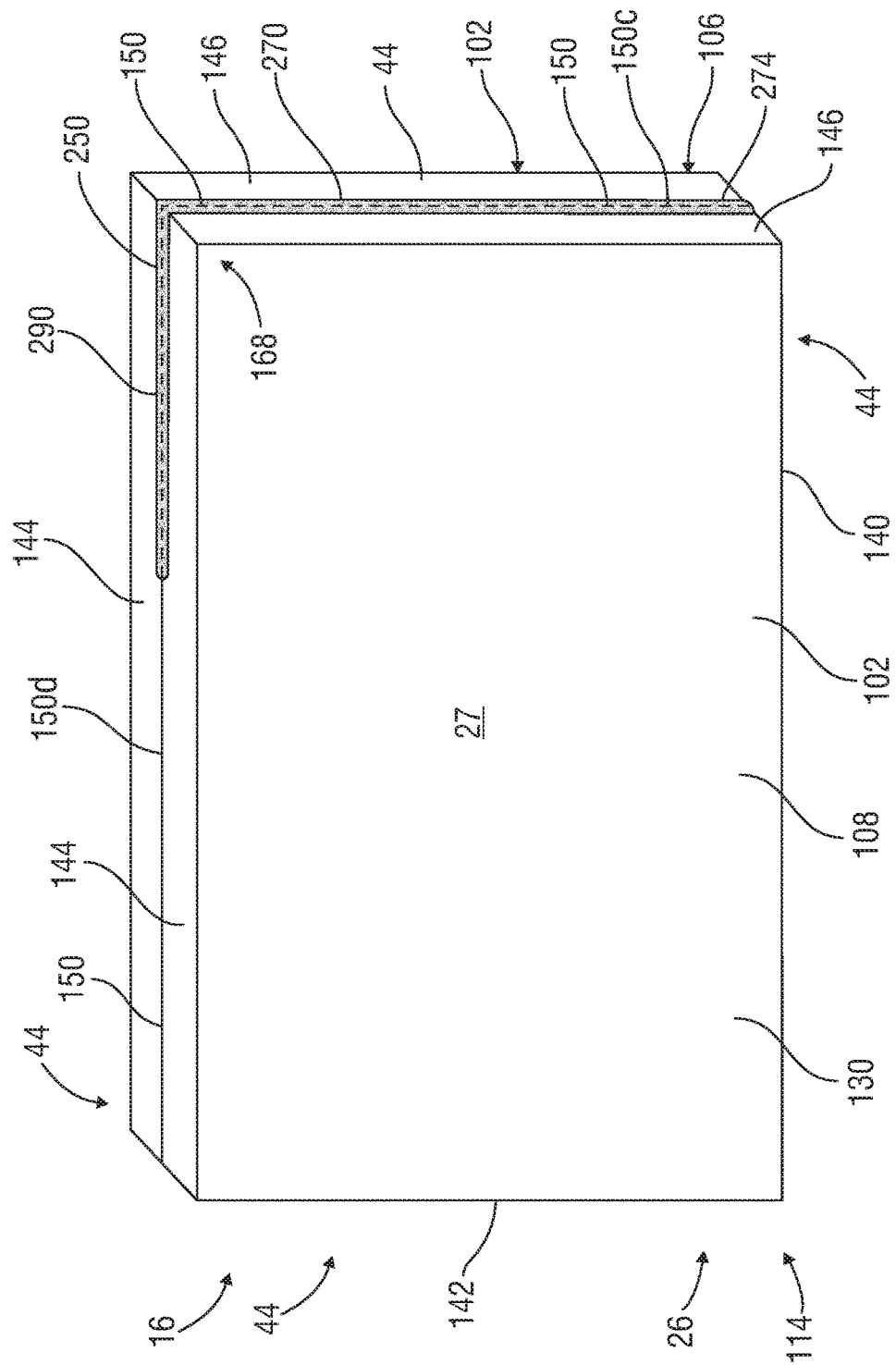
FIG. 20 is a perspective view of another embodiment of an exemplary support mat useful in accordance with one or more embodiments of the present disclosure.

In the illustrated example, the respective upper and lower lips 46, 54 of different mats 26 are interconnectable with locking pins 34 releasably securable through locking pin holes 32 formed therein. The locking pin holes 32 and locking pins 34 may have any suitable form, construction, configuration, components and operation. In this embodiment, the illustrated mats 26 include a plurality of locking pin holes 32, each configured to accept a releasable locking pin 34 therethrough. Each illustrated mat 26 may include, for example, a total of sixteen locking pin holes 32, eight locking pin holes 32 formed in each set of upper and lower lips 46, 54. However, the present disclosure and the multi-panel mat reinforcement systems 200 and methods herein are not limited to use with mats 26 or other support surface components having "locking pin" holes, but can be used with mats 26 or other support surface components having other suitable orifices, openings, holes or cavities formed therein. Thus, as used herein, the terms "hole" and variations thereof mean any hole, opening, orifice or cavity formed in a mat 26, panel or other component of a support surface, having any desired shape, location, configuration and form. Further, the present disclosure is not limited to use with mats 26 or other support surface components having "locking pin" holes or other orifices, holes or cavities formed therein. In other words, the multi-panel mat reinforcement systems 200 and methods herein may be used with mats 26 not having any "locking pin" holes or other orifices, holes or cavities formed therein (e.g. FIG. 20).

Figure 23:
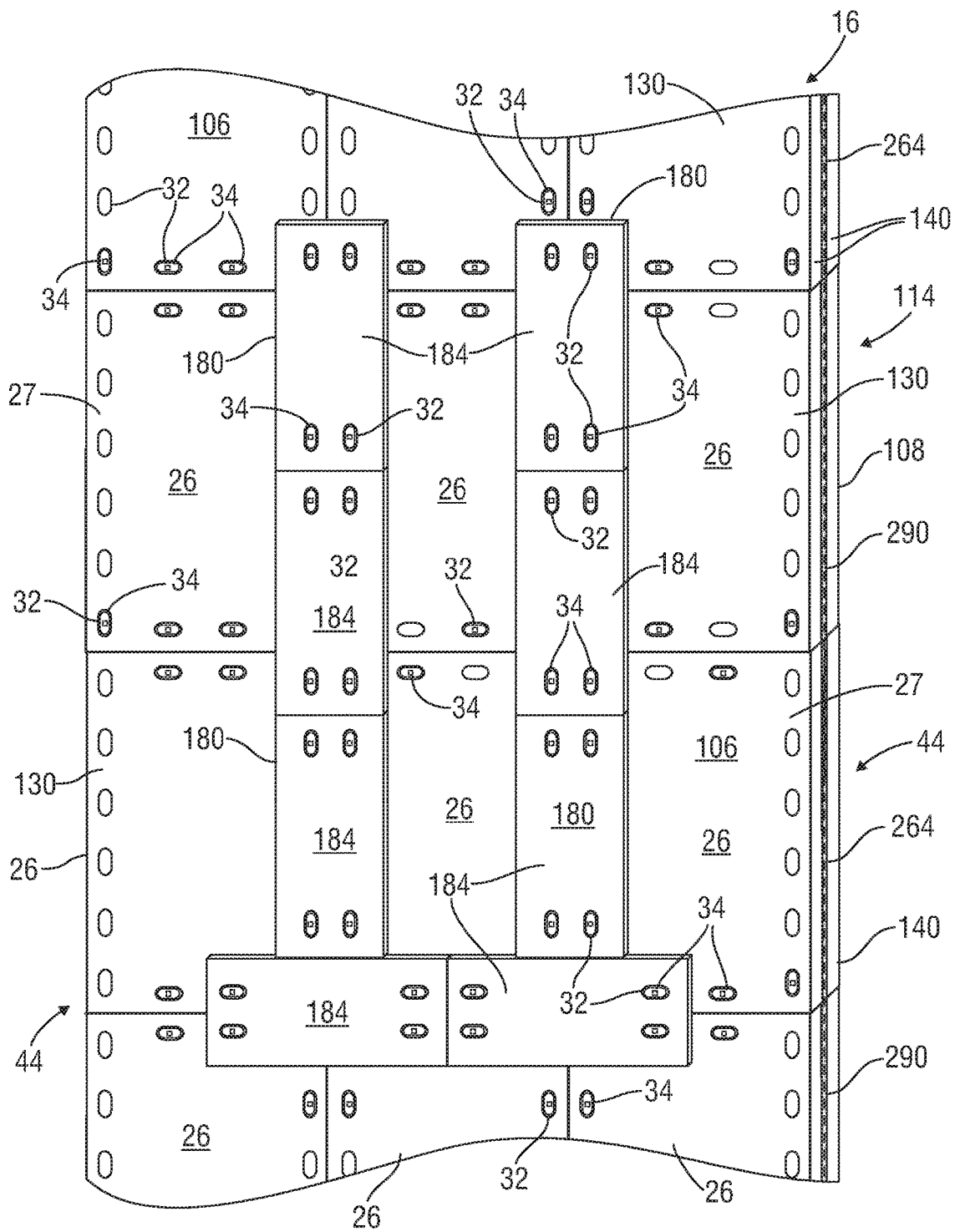
FIG. 23 is an exemplary load-supporting surface that includes numerous of the exemplary mats of FIG. 21 and exemplary mating plates of FIG. 22 in accordance with one or more embodiments of the present disclosure.

Referring to FIGS. 21-23, in some embodiments, mat connectors 180 may be used (e.g. along with locking pins 34) to interconnect the mats 26 or couple one or more mats 26 with one or more other components. For example, the mat connectors 180 may be particularly useful with mats 26 that have no protruding lips 40 or other portions (e.g. non-stepped-configuration mats 26). When included, the mat connectors 180 may have any suitable form, configuration and operation. In this embodiment, the mat connectors 180 are mating plates 184. The mating plates 184 may be constructed of the same material as the mats 26 (e.g. thermoplastic material, rubber, plastic, fiberglass, fiber reinforced plastic, recycled rubber or other material, wood, steel, steel-framed wood, aluminum, or any other desired material or combination thereof) or any other suitable material. In this example, the mating plates 184 are steel, have dimensions (e.g. length, width, thickness) smaller than the mats 26 and include holes (e.g. locking pin holes) 32 for receiving locking pins 34, similarly as described above with respect to the mats 26.

As shown in FIG. 22, the exemplary mating plates 184 are configured to be placed atop adjacent mats 26 in the support surface 16 and releasably interconnected therewith with locking pins 34. In this example, the mating plates 184 may be positioned horizontally or vertically. If desired, the mat connectors 180 may include protruding alignment tabs, or fins, 188, such as to extend between adjacent mats 26 and assist in aligning the connectors 180 relative to the mats 26.

Referring back to FIGS. 1 & 2, some examples of locking pins 34 which may be used in various embodiments of the present disclosure are shown and described in U.S. Pat. No. 6,722,831 to Rogers et al., entitled "Fastening Device" and issued on Apr. 20, 2004, U.S. Pat. No. 8,388,291 to Rogers, entitled "Mat Lock Pin" and issued on Mar. 5, 2013, U.S. Pat. No. 9,068,584 to McDowell et al., entitled and "Apparatus & Methods for Connecting Mats" and issued on Jun. 30, 2015, U.S. patent application Ser. No. 14/752,067 entitled "Adjustable Mat Locking Pin and Methods of Use Thereof" and filed on Jun. 26, 2015, and U.S. patent application Ser. No. 15/259,407 entitled "Apparatus and Methods for Connecting Components of a Support Surface" and filed on Sep. 8, 2016, as well as all related patents issuing from each of the applications mentioned above, each of which has a common Assignee as the present patent application and the entire contents of which are hereby incorporated by reference herein in its entirety. In some embodiments, the locking pins 34 may form a fluid-tight seal around, or in, the locking pin holes 32 within which they are engaged, such as the exemplary locking pin 34 illustrated and described in U.S. Pat. No. 9,068,584, U.S. patent application Ser. Nos. 15/259,407 and 14/752,067.

Referring to FIGS. 3A & 3B, the illustrated locking pin holes 32 of the mats 26 have a non-circular cross-sectional shape. In this example, the locking pin holes 32 have an oval shape, such as to accept an oval-shaped enlarged head 36 of the illustrated locking pins 34. An oval-shaped recess, or indentation, 33 is formed in the upper and lower surfaces 27, 29 of each exemplary mat 26 around each locking pin hole 32. In this embodiment, the indentation 33 is also oval and configured to at last partially seat the oval-shaped enlarged head 36 of the illustrated locking pin 34. However, this configuration is not required in all embodiments.

Figure 4B:
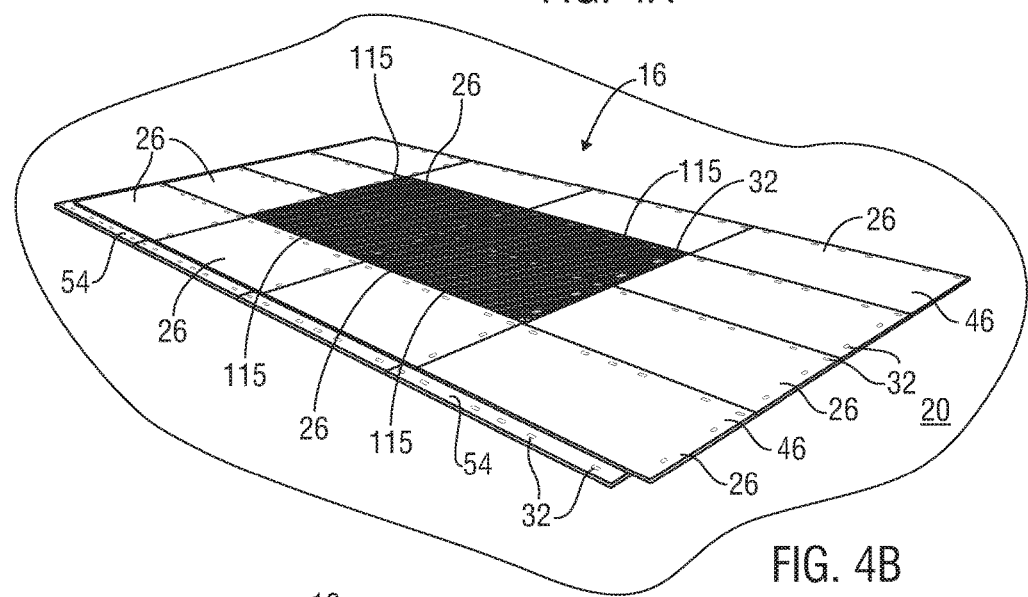
FIG. 4B is a perspective view of an exemplary support surface having multiple mechanically interconnected mats, some of which are equipped with an embodiment of an electrically-conductive cover and are electrically coupled together.
Figure 4C:
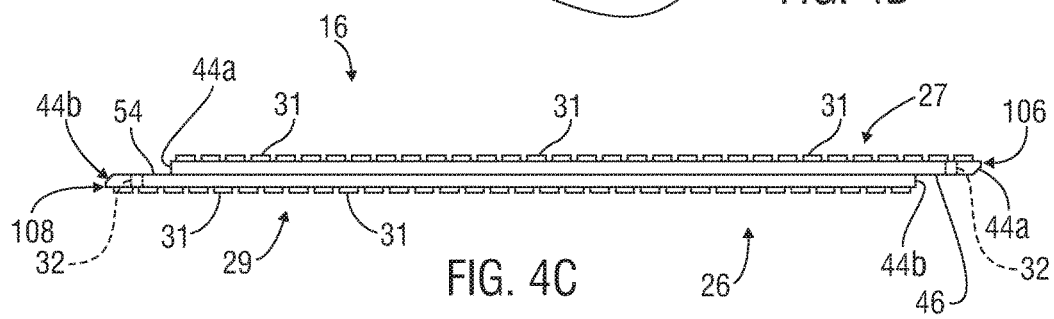
FIG. 4C is a side view of an exemplary mat useful in accordance with one or more embodiments of the present disclosure.

As shown in FIG. 4C, in some embodiments, the upper and lower surfaces 27, 29 of the mat 26 may include raised traction promoting elements, or treads, 31 formed in or extending from the mat 26. In some stepped-configuration embodiments, the treads 31 may not be included on the underside of each panel 106, 108 of the mat 26 that extends beyond the other respective panel 106, 108. In other words, in the illustrated mat 26, the upper surface 27 of the mat 26 that forms the lower lip 54 (which is the portion of panel 108 that extends beyond panel 106) is absent the treads 31. Thus, the locking pin holes 32 on the exemplary upper lips 46 are surrounded by treads 31, while the locking pin holes 32 on the illustrated lower lips 54 are not surrounded by treads 31. Of course, when the same mat 26 is turned over, the former lower lip 54 (absent treads 31) becomes an upper lip 46 having treads 31. Some exemplary raised traction promoting elements that may be used on the mats 26 in some embodiments are shown and described in U.S. Pat. No. 6,511,257.

It should be noted, however, that the present disclosure is not limited to use with the above-described or referenced types and configurations of support surfaces 16, mats 26, locking pins 34 and holes 32, or to the disclosures of the above-referenced patents and patent applications. Any suitable support surfaces 16, mats 26 and related components may be used. Thus, the present disclosure and appended claims are not limited by the type, capabilities, configuration or other characteristics of the support surface 16, mats 26 and related components, except and only to the extent as may be explicitly required in a particular claim hereof or in a patent claiming priority hereto and only for such claim(s) and any claim(s) depending therefrom.

Referring back to FIG. 2, in some embodiments, a gap 22 may be formed between adjacent edges 44 of adjacent interconnected mats 26 in the support surface 16, and one or more seal members 10 may be included therein. For example, the seal member(s) 10 may provide a liquid-tight seal in the gap 22 between adjacent mats 26 to prevent liquid introduced onto the support surface 16 from seeping or flowing between mats 26 and/or other components and below the support surface 16. Some embodiments of seal members 10 that may be used in the gaps 22 are disclosed in U. S. Pat. No. 9,212,746 to McDowell, issued on Dec. 15, 2015 and entitled "Apparatus and Methods for Sealing Between Adjacent Components of a Load-Supporting Surface", U. S. Pat. No. 9,499,946 issued on Nov. 22, 2016 and entitled "Method of Sealing Between Adjacent Components of a Load-Supporting Surface With at Least One Closed-Cell Compressible Rubber Seal", U. S. Pat. No. 9,637,871 issued on May 2, 2017 and entitled "Load-Supporting Surface with Actively Connected Gap Seals and Related Apparatus and Methods" and U.S. Pat. No. 9,404,227 issued on Aug. 2, 2016 and entitled "Load-Supporting Surface with Interfacing Gap Seal Members and Related Apparatus and Methods", as well as all related patents, all of which have a common Assignee as the present patent application and the entire contents of which are hereby incorporated by reference herein in their entireties.

The support surface 16 may include or be associated with other components, and the seal member(s) 10 may also or instead be used between any combination of mats 26 and other components associated with the support surface 16. Some examples of such additional components that may be useful in connection with support surfaces 16, such as berm members, spacers, drive-over barriers, liquid drain assemblies, etc., are shown and disclosed in U.S. Pat. No. 9,039,325 and U.S. patent application Ser. No. 13/790,916.

In some instances, such as shown in FIG. 4A, the support surface 16 may be used around an underground borehole 120, such as with the use of a borehole edge (e.g. cellar) seal system 110. Various embodiments of exemplary borehole edge (e.g. cellar) seal systems 110 are shown and described in U.S. patent application Ser. No. 14/497,429, entitled "Apparatus and Methods for Sealing Around the Opening to an Underground Borehole" and filed on Sep. 26, 2014 and U.S. patent application Ser. No. 14/666,584 entitled "Apparatus and Methods for Mechanically Coupling a Sealing System Around the Opening to an Underground Borehole" and filed on Mar. 24, 2015, as well as all related patents issuing from each of the applications mentioned above, all of which have a common Assignee as the present patent application and the entire contents of which are hereby incorporated by reference herein in their entireties.

In various embodiments, such as shown in FIG. 4B, one or more electrically-conductive covers 115 may be used in connection with the support surface 16. Various embodiments of electrically-conductive covers are shown and described in U.S. Pat. Nos. 9,337,586 and 9,368,918 and U.S. patent application Ser. No. 15/178,254.

Referring again to FIG. 1, in many embodiments, the multiple sections, or panels, 102 forming the mat 26 may be interconnected. As used herein, the terms "panel" and variation thereof mean a sheet, section, segment or combination thereof of one or more materials of any desired construction and shape and which is used to form a mat 26 or portion thereof. In this example, the panels 102 form the stepped-configuration and protruding lips 40 of the mat 26 (see e.g. FIG. 5A-C). The illustrated mat 26 includes upper and lower engaged, at least partially overlapping and offset, rectangular-shaped panels 106, 108 of substantially identical dimensions. As used herein, the terms "overlapping" and variations thereof as used in the context of two or more panels 102 mean that one panel 102 rests upon and covers at least part of the other panel 102. As used herein, the terms "offset" and variations thereof as used in the context of two or more overlapping panels 102 mean that the panels 102 are not perfectly aligned one over the other so that one or more portions of each panel 102 are aligned over the other panel(s) 102 and one or more other portions of each panel 102 extend beyond the other panel(s) 102. In other embodiments, the panels 102 used to form the mat 26 may have differing shapes (e.g. a first panel 102 being rectangular and a second panel 102 being square), sizes and/or dimensions (e.g. the second panel being smaller than the first panel 102) or other features. Thus, the panels 102 may have any desired shape and configuration, and the multiple panels 102 used to form a single mat 26 may differ in shape, size, dimensions, configuration and any other characteristics.

The panels 102 may be constructed of any suitable material and interconnected in any desired manner. The exemplary panels 102 are constructed of impermeable material, such as thermoplastic material, and are coupled together by a process known as hot-plate welding. Other example panels 102 may be constructed entirely or partially of rubber, plastic, fiberglass, fiber reinforced plastic, recycled rubber or other material, wood, steel, steel-framed wood, aluminum, or any other desired material or combination thereof, and may be interconnected by other forms of welding, bolts or other mechanical connectors or other methods, etc. Thus, present disclosure is not limited by the material construction and method of interconnecting the panels 102, except and only to the extent as may be explicitly required in a particular claim hereof or in a patent claiming priority hereto and only for such claim(s) and any claim(s) depending therefrom.

Figure 5A:
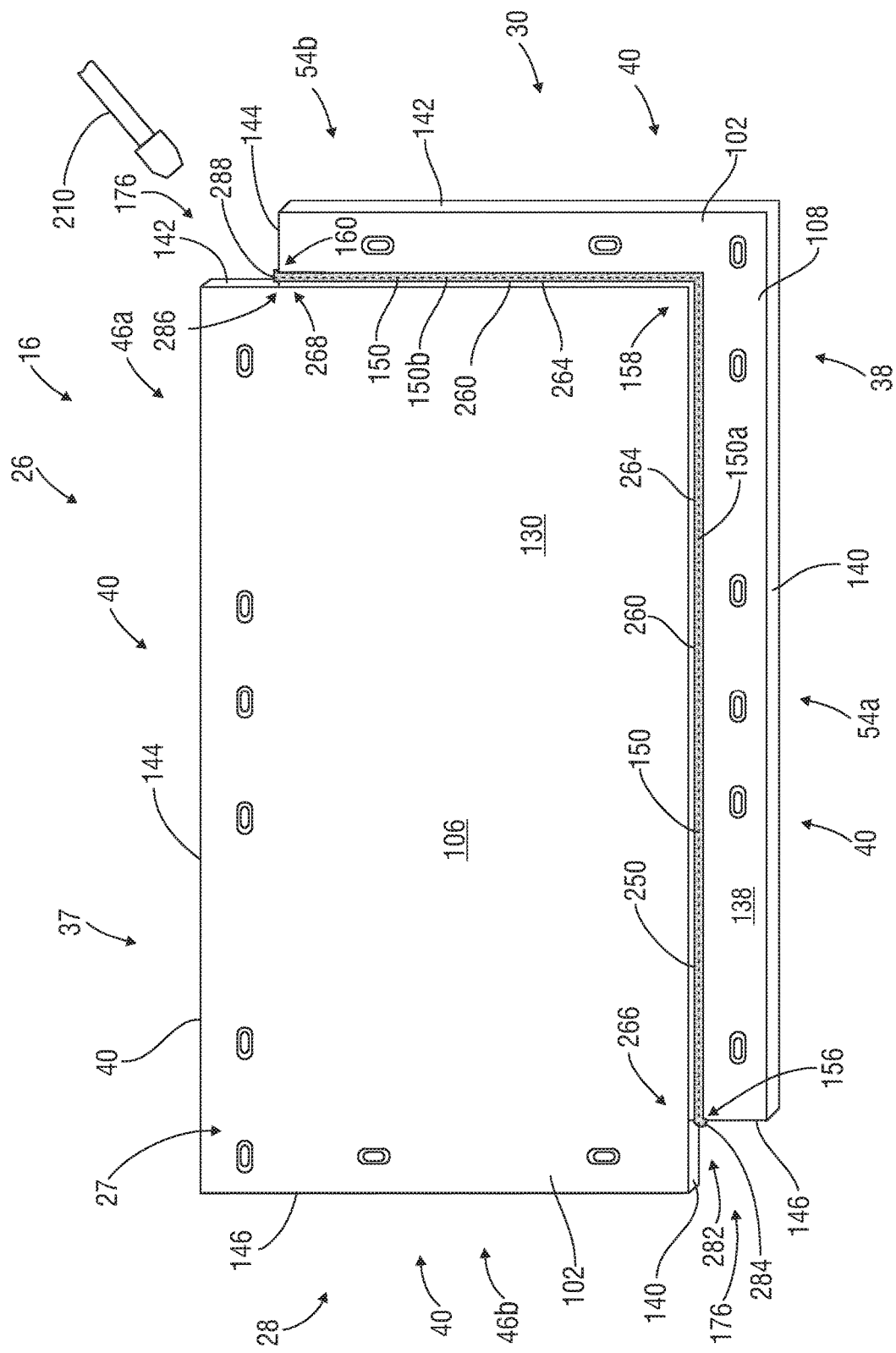
FIG. 5A is a top view of an exemplary mat which has been reinforced with the use of one or more embodiments of an exemplary multi-panel mat reinforcement system and/or method in accordance with the present disclosure.

Referring to FIGS. 5A-C, each exemplary panel 102 includes an outer face 130, an inner face 138 and four outer, or side, edges 140, 142, 144 and 146. The inner faces 138 of the illustrated panels 102 (at least partially) face each other and are coupled together. The exemplary panels 106, 108 partially overlap one another (e.g. by being offset) so that the first and second outer edges 140, 142 of the lower panel 108 extend beyond the corresponding adjacent first and second outer edges 140, 142 of the upper panel 106, and the third and fourth outer edges 144, 146 of the upper panel 106 extend beyond the corresponding adjacent outer edges 144, 146 of the lower panel 108. A distinct protruding lip 40 consisting of part of one of the exemplary panels 102 and bordered by an outer edge of the other panel 102 is formed along each side 28, 30, 37 and 38 of the mat 26. For example, the upper panel 106 forms a long-side upper lip 46a bordered by part of the third outer edge 144 of the lower panel 108 along the first long side 37 of the mat 26, and a short-side upper lip 46b bordered by part of the fourth outer edge 146 of the lower panel 108 along the first short side 28 of the mat 26. The illustrated lower panel 108 forms a long-side lower lip 54a bordered by part of the first outer edge 140 of the upper panel 106 along the second long side 38 of the mat 26, and a short-side lower lip 54b bordered by part of the second outer edge 142 of the upper panel 106 along the second short side 30 of the mat 26. The exemplary lips 46 and 54 are examples of protruding lips 40. However, the present disclosure is not limited to this particular arrangement. For example, the panels 106, 108 may not be offset relative to one another (e.g. perfectly overlapping one another) or may form only one, two, three or more than four protruding lips 40 or other non-overlapping portions. Thus, the multi-panel reinforcement system 200 and methods of the present disclosure may be used with mats 26 having panels 106, 108 that are not offset (e.g. FIGS. 20, 21, 23), or which have any number of protruding lips 40. For example, the mat 26 may be formed of two or more panels 102 having the same shape (e.g. rectangular, square, hexagonal) but different sizes to form only one, two or more protruding lips 40 or other sections. For another example, the mat 26 may be formed of two or more panels 102 having different sizes and shapes (one rectangular panel 102 and one square panel 102) to form only one, two or more protruding lips 40 or other sections.

Still referring to FIGS. 5A-C, in this embodiment, an interface, or seam, 150 is formed between the panels 102 along the intersection of the respective outer edge of each panel 106, 108 that forms the border of each protruding lip 40 (e.g. upper and lower lip 46a, 46b, 54a, 54b) and the adjacent inner face 138 of the other panel 106, 108. For example, as shown in FIG. 5A, first and second interfaces, or seams, 150a, 150b(e.g. FIG. 1) are formed between at least part of the first and second outer edges 140, 142 of the upper panel 106 and the inner face 138 of the lower panel 108, respectively. As shown in FIG. 5B, third and fourth interfaces, or seams, 150c, 150d are formed between at least part of the third and fourth outer edges 144, 146 of the lower panel 108 and the inner face 138 of the upper panel 106, respectively. In this example, the partially overlapping panels 102 are also geometrically-aligned so that the outer edges 44a of the mat 26 (e.g. FIG. 1) extending along each respective side of the upper panel 106 are at least substantially parallel to the outer edges 44b of mat 26 extending along the respective corresponding sides of the lower panel 108. As used herein, the terms "geometrically-aligned" as used in the context of two or more overlapping, offset panels 102 mean that that the outer edges extending along each respective side of one panel are at least substantially parallel to the outer edges of the respective corresponding sides of the other panel(s). In other embodiments, the panels 102 may not be geometrically-aligned and the outer edges thereof (e.g. edges 140, 142, 144, 146) and the outer edges (e.g. edges 44a, 44b) of the mat 26) not parallel.

In other embodiments, the seam(s) 150 may be formed at any other location(s) on the mat 26. For example, when the panels 102 completely overlap one another, one or more seams 150 may be formed along, or between, one or more outer edges 140, 142, 144 and 146 of the adjacent panels 102 (see e.g. FIGS. 20-21) and along the outer edges 44 of the mat 26. Thus, the location and orientation of the seam(s) 150 of the mat 26 are not limiting upon the present disclosure, except and only to the extent as may be explicitly required in a particular claim hereof or in a patent claiming priority hereto and only for such claim(s) and any claim(s) depending therefrom.

It should be understood that none of the particular embodiments or features described or shown in FIGS. 1-4C or described above with respect to FIGS. 5A-C, or in the above-referenced patents and patent applications, are required for, or limiting upon, the present disclosure, except and only to the extent as may be explicitly required in a particular claim hereof or in a patent claiming priority hereto and only for such claim and any claims depending therefrom.

Figure 6:
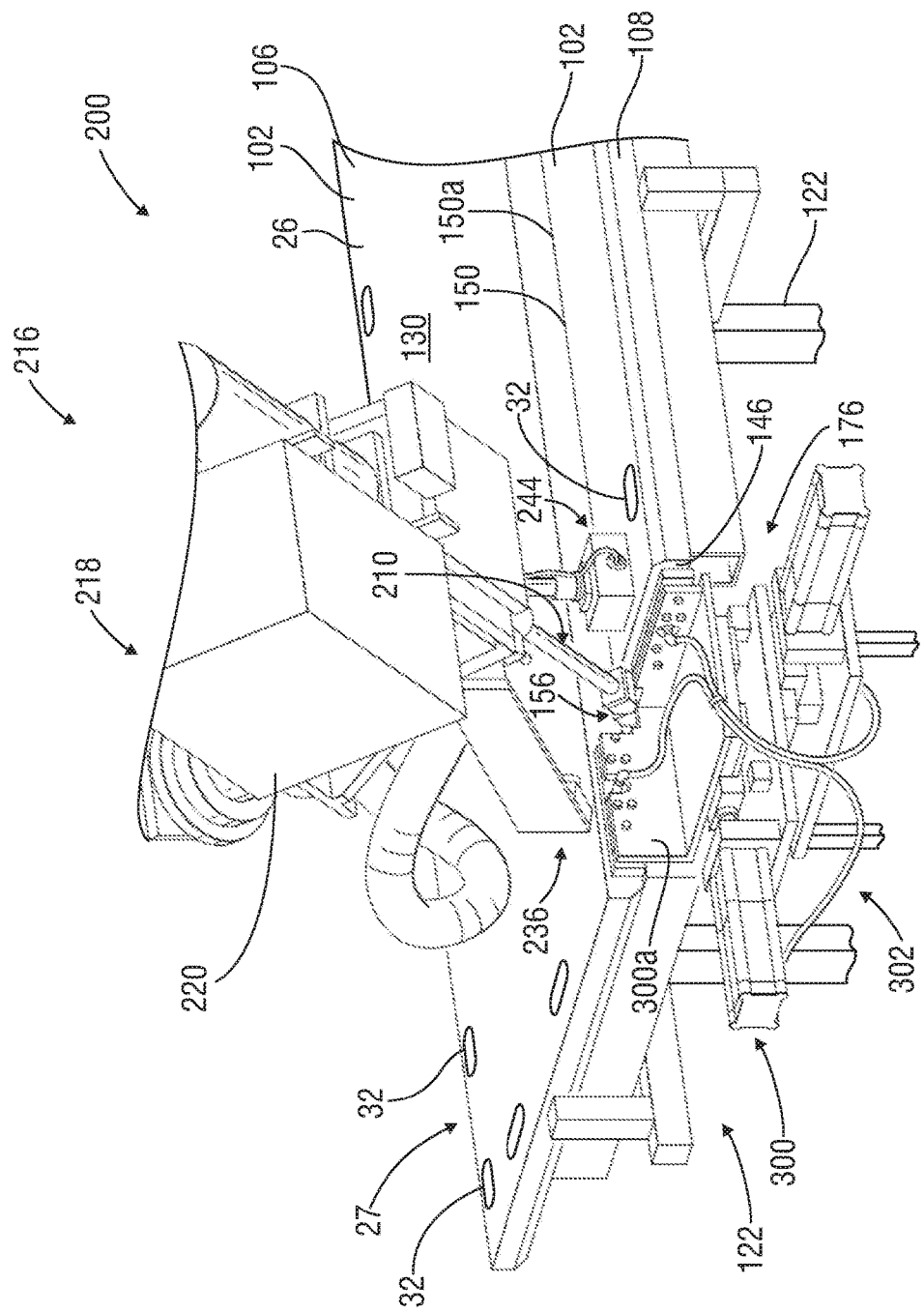
FIG. 6 is a perspective view of an exemplary mat in a horizontal position at the beginning of reinforcement thereof with the use of one or more embodiments of an exemplary multi-panel mat reinforcement system and/or method in accordance with the present disclosure.

Referring to FIG. 6, an embodiment of a multi-panel mat reinforcement system 200 and methods for forming at least one reinforcement weld on the mat 26 will now be described. The exemplary system 200 includes at least one weld-forming material dispenser 210 useful to apply weld-forming material over (or proximate to) at least one seam 150 formed between at least two of the panels 102 of the mat 26 to form at least one weld that reinforces the mat 26 (see also FIGS. 20-23). As used herein, the terms "dispenser" and variations thereof mean any suitable device capable of dispensing at least partially liquid, semi-liquid or molten material or the like to form one or more welds (e.g. welds 264, 274, 284, 288) in the exemplary multi-panel mat reinforcement systems or methods of the present disclosure. This may be desirable, for example, to strengthen the mat 26 at the reinforced location, enhance the overall strength and integrity of the mat 26, provide a substantially, or entirely, fluid-tight seal at the reinforced location (e.g. to prevent liquid seepage between the panels 102), provide or improve the aesthetic appearance of the mat 26 at the reinforced location, provide a consistent or other desired weld geometry, a combination thereof or any other purpose. As used herein, the terms "geometry" and variations thereof as used with the terms "weld", "weld-forming material", "stream of weld-forming material" and variations thereof mean one or more of the cross-sectional shape, thickness, contour or other geometric characteristic of the subject weld, weld-forming material or stream of weld-forming material.

Referring back to FIGS. 5A-5B, in this embodiment, on the top 27 of the mat 26 (FIG. 5A), one or more dispensers 210 applies, or places, at least a first stream 260 of weld-forming material 250 atop the first and second ("top-side") seams 150a, 150b to form a first "linear" weld 264 atop those seams 150a, 150b. This part of the exemplary process is sometimes referred to herein as the "first run". On the bottom 29 of the exemplary mat 26 (FIG. 5B), one or more illustrated dispensers 210 applies, or places, at least a second stream 270 of weld-forming material 250 atop the third and fourth seams ("bottom-side") 150c, 150d to form a second "linear" weld 274 atop those seams 150c, 150d. This part of the exemplary process is sometimes referred to herein as the "second run". As used herein, the terms "linear weld" and variations thereof mean a weld extending along a desired path on (or across) a mat 26, the path not necessarily limited to a straight line (e.g. may include curves or turns). For example, as provided above, the desired path of the first exemplary linear weld 264 extends over both seams 150a, 150b (including the corner 158), while the desired path of the second exemplary linear weld 268 extends over both seams 150c, 150d (including the corner 168).

In other embodiments, only one, or more than two, streams of weld-forming material 250 may be applied to the mat 26 or between panels 102 to form only one, or more than two, welds over or proximate to one or more seams 150 at any location on the mat 26. For example, the system 200 may be used to form welds over only one, or more than two, ("top-side") seams 150 extending at least partially on the top 27 of the mat 26 and only one, or more than two, ("bottom-side") seams 150 extending at least partially on the bottom 29 of the mat 26, or at any other location on the mat 26. Thus, the present disclosure is not limited to only applying a first stream 260 of weld-forming material 250 atop the first and second seams 150a, 150b to form a first linear weld 264 atop those seams 150a, 150b and applying a second stream 270 of weld-forming material 250 atop the third and fourth seams 150c, 150d to form a second linear weld 274 atop those seams 150c, 150d. For example, in FIGS. 20 & 21, the mat 26 is not a stepped-configuration mat and does not have any protruding lips 40 (e.g. lips 46, 54 of FIGS. 1, 5A, 5B). One or more streams of weld-forming material 250 may thus be applied atop the respective seams 150a, 150b, 150c, 150d formed between the illustrated aligned, entirely overlapping, panels 106, 108 around all or part of the perimeter 114 of the illustrated mat 26. For example, one or more continuous welds, or first and second linear welds 264, 274, may be applied atop the respective seams 150a, 150b, 150c, 150d. For another example, the mat 26 may have a protruding lip 40 formed along on only one side, or two, three or more than four sides thereof. In some instances, it may be desirable to form a reinforcement weld along one or more seams 150 extending along one or more protruding lip(s) 40 and one or more seams 150 formed between aligned edges of the panels 102 (not having protruding lips 40).

Referring back to FIGS. 5A-5B, if desired, one or more dispensers 210 may also be used to apply weld-forming material to at least partially form one or more "transition" welds to join two or more other (e.g. linear) welds. The transition weld(s) may be formed at any location on the mat 26. For example, in this embodiment, a first transition weld 284 is formed to extend between the first and second linear welds 264, 274 at the respective first ends 266, 276 thereof. The exemplary first transition weld 284 (e.g. FIG. 11) extends onto the fourth outer edge 146 of the lower panel 108 and/or the first outer edge 140 of the upper panel 106 adjacent to the intersection 282 of those edges. A second illustrated transition weld 288 is formed to extend between the first and second linear welds 264, 274 at the respective second ends 268, 278 thereof. The exemplary second transition weld 288 (e.g. FIG. 12) extends onto the third outer edge 144 of the lower panel 108 and/or the second outer edge 142 of the upper panel 106 adjacent to the intersection 286 of those edges. However, the transition welds (e.g. first and second transition welds 284, 288) may extend along or across different portions of the mat 26. Also, there may be embodiments and situations in which the transition welds (e.g. first and second transition welds 284, 288) are partially or fully pre-formed as part of, or otherwise provided on, the mat 26, eliminating the need for the system 200 to (entirely or partially) form them during the exemplary multi-panel mat reinforcement process. Other embodiments may include only one transition weld or no transition welds. Likewise, the present disclosure is not limited to forming linear and/or transition welds, but may be used to form any sort of reinforcing weld on a mat 26 or other component. Thus, the term "weld" as used herein means a linear weld, transition weld or any other form of weld.

Still referring to FIGS. 5A-5B, if desired, each or any among the welds (e.g. the linear welds 264, 274 and transition welds 284, 288) may be continuous or discontinuous welds. As used herein, the terms "continuous weld" and variations thereof mean a rigid contiguous mass formed from at least one layer of weld-forming material across the desired seam or surface. For example, continuous first and/or second linear welds 264, 274 extend across the top and entire length of one or more respective corresponding seams 150, or other portion(s), of a mat 26. For another example, a continuous first transition weld 284 extends between and joins the first and second linear welds 264, 274 at the respective first ends 266, 276 thereof, and a continuous second transition weld 288 extends between and joins the first and second linear welds 264, 274 at the respective second ends 268, 278 thereof. If all the welds over one or more seams 150 and/or other areas on the mat 26 (e.g. the first and second linear welds 264, 274 and the first and second transition welds 284, 288) are continuous welds, the resulting contiguous weld (e.g. extending around the entire mat 26) is sometimes referred to herein as a "closed-loop mat reinforcement" weld 290. In some embodiments, the formation of one or more welds 264, 274, 284, 288, or a closed-loop mat reinforcement weld 290, may provide any desired benefits, such as to strengthen the mat 26 at the reinforced location, enhance the overall strength and integrity of the mat 26, provide a substantially, or entirely, fluid-tight seal at the reinforced location, provide or improve the aesthetic appearance of the mat 26 at the reinforced location, provide a consistent or other desired weld geometry, a combination thereof or any other purpose. As used herein, the terms "discontinuous weld" and variations thereof mean a series of at least two unconnected rigid contiguous masses extending along different portions of one or more seams 150 or other mat surfaces, each distinct mass being formed from at least one layer of weld-forming material. For example, the first linear weld 264 may have one or more breaks in the weld-forming material and thus be a discontinuous weld (e.g. which could be filled in later or left un-welded).

As used herein, the terms "stream of weld-forming material" and variations thereof mean one or more continuous or non-continuous streams of weld-forming material placed over or proximate to the desired seam(s). In the exemplary embodiment, the first stream 260 (over the first and second seams 150a, 150b) is ideally continuous, or non-interrupted, as is the second stream 270 (over the third and fourth seams 150c, 150d). However, there may be instances and circumstances where one or more of the streams of weld-forming material are non-continuous or interrupted and/or may include multiple passes or streams of weld-forming material. For example, the first and/or second (and/or other) streams of weld-forming material may include two, three or more passes over the corresponding seam(s), such as to increase the height or thickness of the respective weld. For other examples, the first and/or second (and/or other) streams of weld-forming material may include one or more passes adjacent to the corresponding seam(s), or one or more passes over and one or more passes adjacent to the corresponding seam(s). Thus, the present disclosure is not limited to providing only one continuous respective stream 260, 270 of weld-forming material 250, except as may be expressly required in a particular claim of this patent or a patent claiming priority hereto, and only for that claim and any claims depending therefrom.

As used herein, the terms "weld-forming material" and variations thereof mean any desired material, such as plastic, thermoplastic, rubber or other elastomeric substance, adhesive(s), caulking, water resistant material, or any other desired material (e.g. homogenous or a combination of compatible materials) that is useful to form the desired welds (e.g. welds 264, 274, 284, 288), can be applied (e.g. in a liquid, semi-liquid, molten or semi-molten state) to the mat 26 via the dispenser(s) 210 and will thereafter form the desired weld on the mat 26. In the exemplary embodiment, the weld-forming material 250 is homogenous molten plastic which hardens after being applied to the mat 26 to form rigid plastic, but the present disclosure is not limited to this type of weld-forming material 250. In some embodiments, one or more compatible materials or substances may be added to the molten plastic to provide enhanced strength or any other desired characteristic(s) of the welds (e.g. first and/or second linear welds 264, 274 and/or the first and/or second transition welds 284, 288). For another example, a second or multiple layers of one or more types of weld-forming material 250 (e.g. strength enhancer) may be applied on top of or adjacent to another one or more types of weld-forming material 250 (e.g. molten plastic) to form any of the desired welds (e.g. welds 264, 274, 284, 288), or any other arrangement of multiple layers of one or more types of weld-forming material 250 may be applied to form any of the welds as desired. Further, different weld-forming materials 250 may be used to form any different parts of the welds (e.g. welds 264, 274, 284, 288).

Still referring to FIGS. 5A & 5B, it should also be noted that, in some embodiments, the strength of the transition welds (e.g. transition welds 284, 288) and their blending into, or coupling with, the other welds (e.g. first and second linear welds 264, 274) may be critical to the strength and integrity of the entire mat 26 because structural failure of the mat 26 may originate at, or propagate from, these locations. Thus, in many embodiments, the transition welds (e.g. welds 284, 288) are formed with optimal strength, robustness and coupling to the other welds (e.g. first and second linear welds 264, 274).

Placement of the weld-forming material 250 to reinforce the mat 26 (e.g. atop the seams 150*a-d* (e.g. FIG. 5A-B) to form the welds 264, 274 and onto the various edges of the panels 106, 108 to form the transition welds 284, 288 (e.g. FIGS. 11-12)) may be made in any desired manner and order, simultaneously or otherwise as desired, with the same or multiple dispensers 210, with the mat 26 in any desired position and with the mat 26 and/or dispenser(s) 210 moving relative to the other. For example, in some embodiments, the weld-forming material 250 may be applied in the first and second streams 260, 270 substantially simultaneously (e.g. with different dispensers 210) and joined together (e.g. at the transition welds 284, 288) in a molten state. For another example, when multiple dispensers 210 are used to apply the respective first and second streams 260, 270 of weld-forming material and the first and second transition welds 284, 288, the dispensers 210 may initiate and complete their respective applications of weld-forming material at the same start and finish points on the mat 26. For yet another example, in some embodiments, the first and second streams 260, 270 of weld-forming material 250 and first and second transition welds 284, 288 may be applied to the mat 26 in one pass by one dispenser 210. For still a further example, in may embodiments, it may be desirable or beneficial not to start or complete the first and/or second runs with the formation of the first and/or second transition welds 284, 288, but to instead start and complete the first and second runs (and form the transition welds 284, 288) at one or more midpoints of one or more seams 150*a-d*, such as to obtain optimal strength and integrity at the first and second transition welds 284, 288, or other desired purpose. For another example, the dispenser(s) 210 may be automated to form the welds, such as described herein, with little or no human involvement or operator intervention or participation. In fact, the entire process or any portion thereof, such as described herein, may be performed with little or no human involvement or operator intervention or participation. However, in some embodiments, a manually-operated dispenser 210 may be used for part of, or the entire, mat reinforcement process.

In some embodiments, the weld-forming material 250 may be applied to the mat 26 to ensure all the welds (e.g. welds 264, 274 and welds 284, 288) blend, fuse or merge, together to form the closed-loop mat reinforcement weld 290 having at least substantially consistent material construction, uniform or other desired geometry (e.g. cross-sectional shape, thickness), optimal integrity, other characteristic(s) or a combination thereof. It should be noted that the weld geometry may be varied along any particular weld or among welds on the mat 26. For example, it may be desirable to vary the geometry along any one or more linear welds 264, 274 or as between the welds 264, 274. The same is true for the exemplary transition welds 284, 288; it may be desirable to vary the geometry along any one or more transition welds 284, 288 or as between the transition welds 284, 288. Likewise, it may sometimes be desirable to vary the weld geometry as between either, or both, linear welds 264, 274 and either, or both, transition welds 284, 288. For example, in some embodiments, the transition welds 284, 288 may be formed with a thicker geometry than the linear welds 264, 274.

Figure 8:
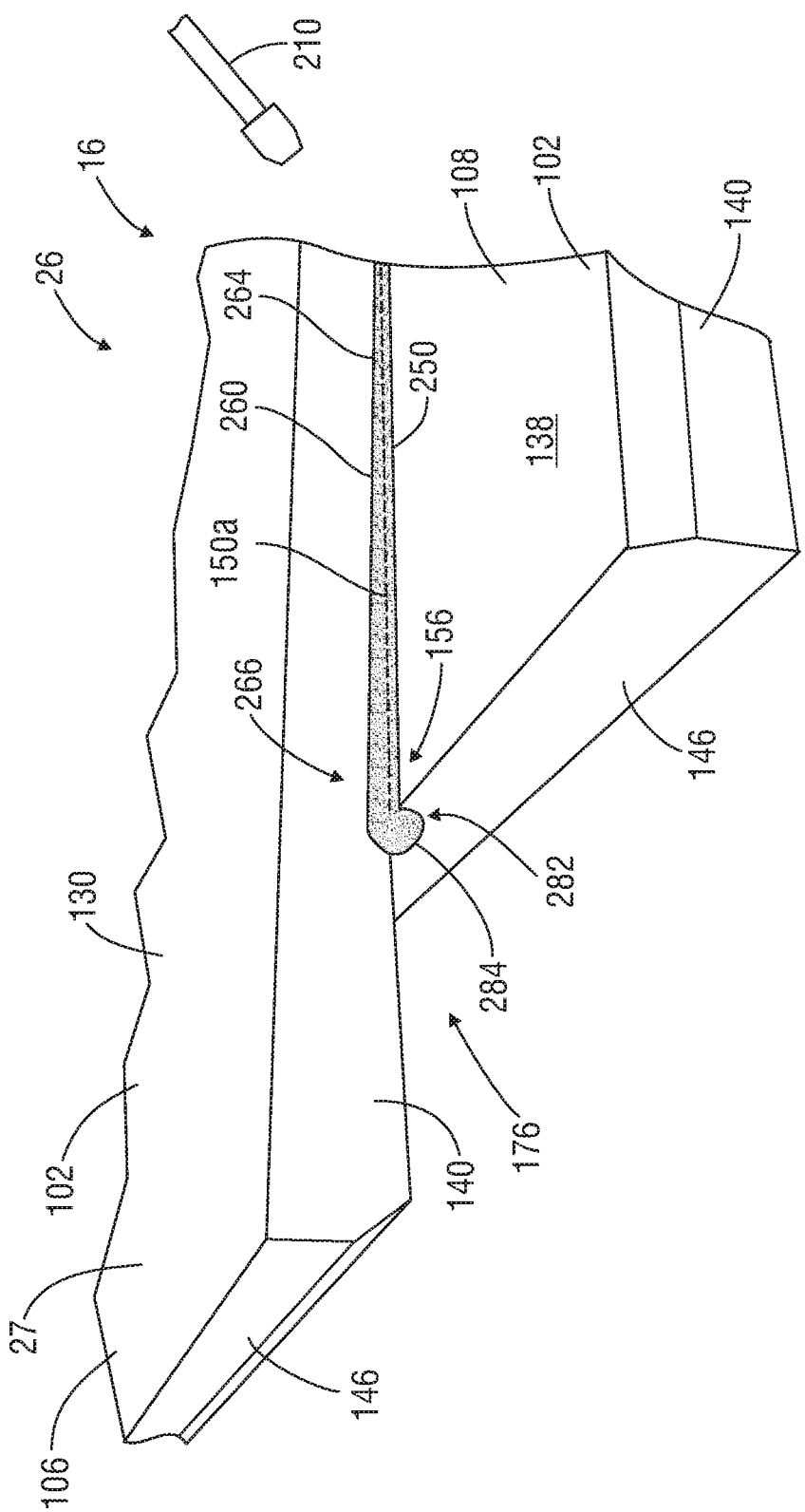
FIG. 8 is a perspective view showing part of the upper surface of an exemplary mat after at least part of an exemplary first transition weld and first stream of weld-forming material have been applied to the mat in accordance with one or more embodiments of the present disclosure.
Figure 9:
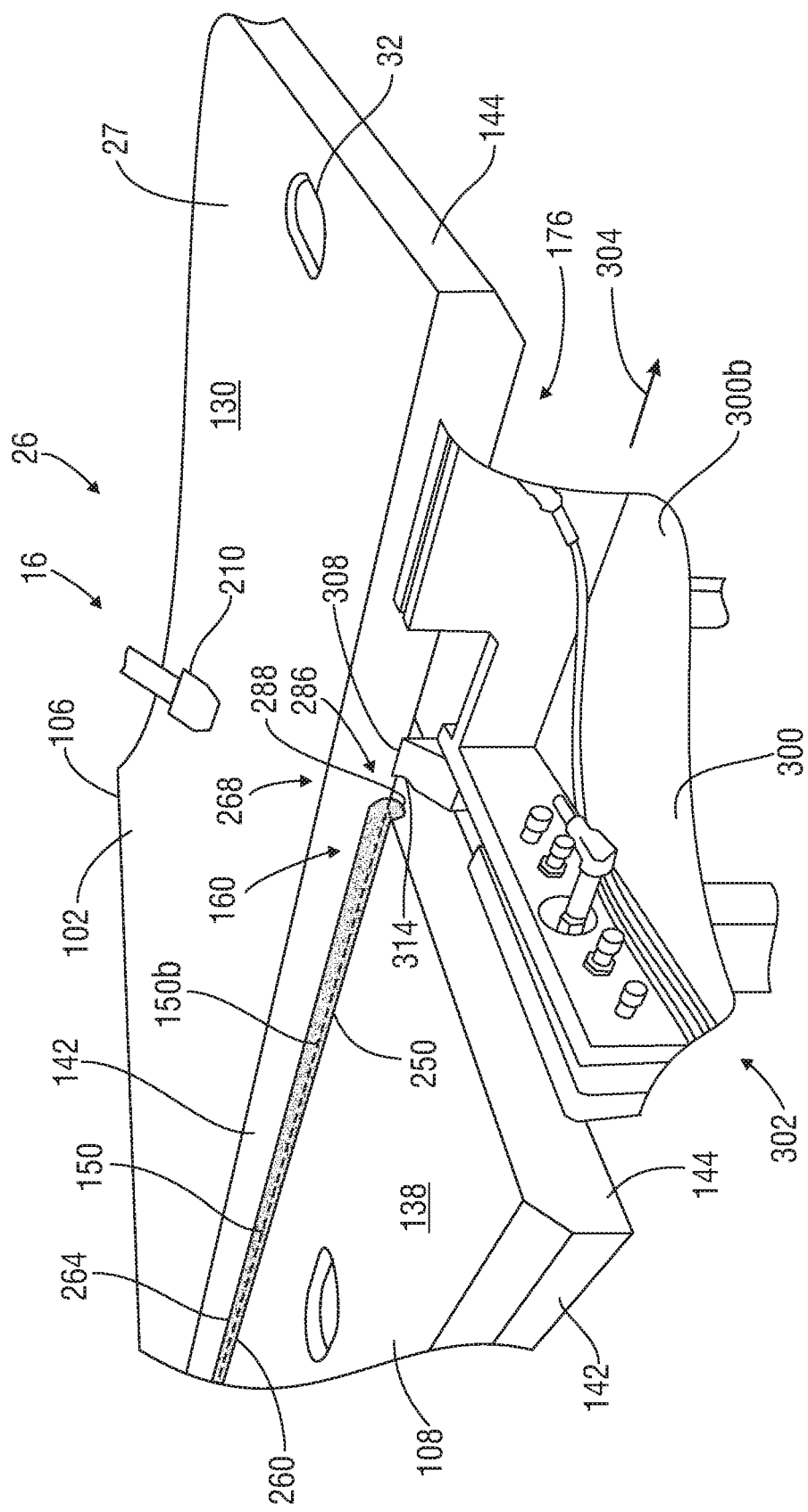
FIG. 9 is a perspective view of part of exemplary mat of FIG. 8 after application of the exemplary first stream of weld-forming material and formation of at least part of an exemplary second transition weld in accordance with one or more embodiments of the present disclosure.

Referring back to the embodiment of FIG. 6, at or prior to commencement of the multi-panel mat reinforcement process, the mat 26 may be positioned in any desired manner and with any suitable arrangement of components. For example, the mat 26 may be placed upon one or more supports, or pedestals, 122, such as by one or more suitable lifting devices (e.g. crane, robot, winch, etc.). In this embodiment, the mat 26 is initially placed (e.g. by one or more lifting devices) in a first generally horizontally-oriented position with the top 27 of the mat 26 (e.g. the outer face 130 of the upper panel 106) facing up for placement of the first stream of weld-forming material 260 (e.g. FIG. 5A) and, if desired, formation of at least part of the first and/or second transition welds 284, 288 (e.g. FIGS. 8-9). Thereafter, the illustrated mat 26 is flipped over (e.g. by one or more lifting devices) to a second generally horizontally-oriented position with the bottom 29 of the mat 26 (e.g. outer face 138 of the lower panel 108, FIG. 5B) facing up for placement of the second stream 270 of weld-forming material and, if desired, formation of at least part of the first and/or second transition welds 284, 288 (e.g. FIGS. 11-12). Of course, the reverse positioning of the mat 26 and order of the multi-panel mat reinforcement process may instead be used. Further, since the exemplary mat 26 is reversible, it may not make any difference which side (the top 27 or bottom 29) of the mat 26 is reinforced first or second.

In other embodiments, the mat 26 may be generally vertically or angularly-oriented (any angle between horizontal and vertical), such as to provide concurrent access to both the top 27 and bottom 29 of the mat 26, or other desired purpose. In some embodiments, in a vertical or angular orientation, no flipping, or other movement, of the mat 26 may be necessary to allow application of the first and second streams 260, 270 of weld-forming material 250 and formation of the first and second transition welds 284, 288. For example, in FIG. 7, the illustrated mat 26 is shown held vertically-oriented in a suitable pedestal, or support, 122 and/or by an overhead carrier 124 (e.g. crane, winch, lifting device). Of course, any other suitable mechanisms or structures may be used to support the mat 26 in a horizontal, vertical or angular position. In this embodiment, if desired, the first and second streams 260, 270 of weld-forming material 250 may be applied (and the first and second transition welds 284, 288 formed) concurrently with multiple dispensers 210 or sequentially by the same dispenser 210, such as described above. For example, the same dispenser 210 may be moveable back and forth between the upper and lower surfaces 27, 29 of the mat 26 to place the first and second streams 260, 270 of weld-forming material and/or form the first and second transition welds 284, 288.

In various embodiments, the mat 26 may be moveable during application of the weld-forming material 250 (e.g. to form the first and/or second linear welds 264, 274 and/or the first and/or second transition welds 284, 288). For another example, the mat 26 and dispenser(s) 210 may be concurrently moved, or one may be stationary and the other moving, throughout or at certain desired times during application of the weld-forming material 250. Thus, in some embodiments, the dispenser(s) 210 may be stationary throughout the entire multi-panel mat reinforcement process. For example, the mat 26 may be selectively movable relative to the at least one dispenser 210. In some embodiments in which the mat 26 is moveable relative to the dispenser(s) 210, some or all of the components described herein may be modified for use. For example, the guidance system 218 (as described below) may be adapted to guide (e.g. via the robotic system 216 described below) the movement and position of the mat 26 relative to the dispenser(s) 210 and rate of extrusion of weld-forming material 250 from the dispenser(s) 210. The present disclosure is therefore not limited by the position or movement of the mat 26 and the dispenser(s) 210 during the reinforcement process or the order in which the multi-panel mat reinforcement process is performed, except as may be expressly required in a particular claim of this patent or a patent claiming priority hereto, and only for that claim and any claims depending therefrom.

Referring back to FIG. 5A, in the exemplary multi-panel mat reinforcement process, in the first run, on the top 27 of the mat 26, a single dispenser 210 starts applying weld-forming material 250 at the end 156 of the first seam 150a closest to the fourth outer edge 146 of the lower panel 108. If desired, at least part of the first transition weld 284 may be formed before, at or near the beginning of the first run, such as by the dispenser 210 dispensing weld-forming material 250 over the fourth outer edge 146 of the lower panel 108 and/or to the adjacent first outer edge 140 of the upper panel 106 (See e.g. FIG. 8). For example, the dispenser 210 may begin dispensing weld-forming material 250 slightly to the left of the end 156 of the first seam 150a, allowing the weld-forming material 250 to adhere to at least part of the adjacent fourth outer edge 146 of the lower panel 108 and the adjacent first outer edge 140 of the upper panel 106 to at least partially form the first transition weld 284.

If desired, the dispenser 210 may seamlessly, fluidly couple the first transition weld 284 (or portion thereof) to the first stream 260 of weld-forming material. For example, without interruption in dispensing weld-forming material 250, the dispenser 210 may continue dispensing weld-forming material 250 and it moves from an initial position (at least partially forming the first transition weld 284) into a linear path over the first seam 150a to apply the first stream 260 of weld-forming material (e.g. FIG. 14), effectively joining the first transition weld 294 with the first linear weld 264. (See e.g. FIG. 8). As used herein, the terms "without interruption" and variations thereof when used in connection with one or more dispensers 210 dispensing weld-forming material, means and includes (i) without any interruption and (ii) without interruption long enough to cause the immediately previously applied weld-forming material 250 to harden or otherwise not be fluidly engageable by the immediately subsequently applied weld-forming material. However, the first transition weld 284 may be formed and coupled to the first linear weld 264 in any other suitable manner and at any other desired time.

Referring still to FIG. 5A, in the exemplary first run, the dispenser 210 moves counterclockwise from the end 156 of the first seam 150a, continuously placing the first stream 260 of weld-forming material 250 over the entire length of the first seam 150a, around the corner 158 (e.g. FIG. 15) at the intersection of the first and second seams 150a, 150b and over the entire length of the second seam 150b to the end 160 of the second seam 150b to form the first linear weld 264. As used herein the terms "corner" and variations thereof are not limited to a sharp turn, or sharply angled transition, between, or formed by, adjacent surfaces, but could be a gradual, rounded, radial or sweeping turn or transition between, or formed by, adjacent surfaces. In some embodiments, at any time during the placement of the first stream 260 of weld-forming material, the dispenser 210 may move back and forth, or otherwise jump around, at or between any locations along the first and second seams 150a, 150b to ensure the desired weld geometry (e.g. cross-sectional shape) is obtained, apply multiple layers or coats, form a continuous or discontinuous first linear weld 264 or for any other purpose.

In some embodiments, at least part of the second transition weld 288 may be formed at, near or after the end of the first run, such as by the dispenser 210 placing weld-forming material 250 over the third outer edge 144 of the lower panel 108 and/or the adjacent second outer edge 142 of the upper panel 106. For example, the dispenser 210 may dispense weld-forming material slightly to the right of the end 160 of the second seam 150b, allowing the weld-forming material to adhere to at least part of the adjacent third outer edge 144 of the lower panel 108 and the adjacent second outer edge 142 of the upper panel 106 to at least partially form the second transition weld 288 (See e.g. FIG. 9).

Still referring to FIG. 5A, if desired, the dispenser 210 may seamlessly, fluidly couple the second transition weld 288 (or portion thereof) to the first stream 260 of weld-forming material. For example, without interruption in dispensing weld-forming material 250, the dispenser 210 may continue dispensing weld-forming material 250 at the end of the first run to at least partially form the second transition weld 288 (See e.g. FIG. 9), effectively joining the exemplary second transition weld 288 (or portion thereof) with the first linear weld 264. However, the second transition weld 288 may be formed and coupled (or not coupled) to the first linear weld 264 in any other suitable manner and at any other desired time.

In other embodiments, one or more dispensers 210 may move in the opposite direction (clockwise) as described above (e.g. from the end 160 of the second seam 150b to the end 156 of the first seam 150a), from any mid-point on either seam 150a, 150b, or different dispensers 210 may move in different directions to form the first linear weld 264. In yet other embodiments, multiple dispensers 210 may simultaneously or sequentially place the first stream 260, or multiple streams, of weld-forming material 250 atop the first and second seams 150a, 150b and/or to at least partially form the first and second transition welds 284, 288.

Referring back to FIG. 5B, in the present embodiment, to apply the weld-forming material 250 for the second run, the mat 26 is flipped over (see e.g. FIG. 10). On the bottom 29 of the illustrated mat 26, a single dispenser 210 starts applying the weld-forming material at the end 166 of the third seam 150c closest to the first outer edge 140 of the upper panel 106 (See also FIG. 11). If desired, at least part of the first transition weld 284 may be formed (or completed) before, at or near the beginning of the second run, such as by the dispenser 210 dispensing weld-forming material over the first outer edge 140 of the upper panel 106 and/or the adjacent fourth outer edge 146 of the lower panel 108. For example, the dispenser 210 may begin dispensing weld-forming material slightly to the left of the end 166 of the third seam 150c, allowing the weld-forming material to adhere to at least part of the adjacent first outer edge 140 of the upper panel 106 and the adjacent fourth outer edge 146 of the lower panel 108 to at least partially form (or complete) the first transition weld 284.

If desired, the dispenser 210 may seamlessly, fluidly couple the first transition weld 284 (or portion thereof) to the second stream 270 of weld-forming material. For example, without interruption in dispensing weld-forming material 250, the dispenser 210 may continue dispensing weld-forming material 250 as it moves from an initial position (dispensing weld-forming material to at least partially form, or complete, the first transition weld 284) into a linear path over the third seam 150c to apply the second stream 270 of weld-forming material (see e.g. FIG. 11), effectively joining the exemplary first transition weld 284 with the second linear weld 274. Further, if the first transition weld 284 was already fluidly coupled or joined to the first stream 260 of weld-forming material (a/k/a the first linear weld 264), both streams 260, 270 (a/k/a the linear welds 264, 274) will be merged or coupled together. However, the first transition weld 284 may be formed and coupled (or not coupled) to the first and/or second linear welds 264, 274 in any other suitable manner and at any other desired time.

It should be noted that, in this embodiment, the need to form at least part of the first transition weld 284 at this time will depend upon the extent of the first transition weld 284 formed around the time of the first run. For example, if the portion of the first transition weld 284 formed at the beginning of the first run was substantial in size (e.g. FIG. 10), only a small amount of weld-forming material 250 may need to be placed on the first outer edge 140 of the upper panel 106 and/or the fourth outer edge 146 of the lower panel 108 to complete the first transition weld 284 and couple it to the second stream 270 of weld-forming material. For another example, if essentially the entirety of the first transition weld 284 was previously formed, the weld-forming material 250 applied at the start of the second run may provide sufficient weld-forming material 250 to merge the existing first transition weld 284 with the second stream 270 of weld-forming material 250.

Referring back to FIG. 5B, in the exemplary second run, the dispenser 210 moves counterclockwise from the end 166 of the third seam 150c (e.g. FIG. 11), continuously applying the second stream 270 of weld-forming material 250 over the entire length of the third seam 150c, around the corner 168 at the intersection of the third and fourth seams 150c, 150d and over the entire length of the fourth seam 150d to the end 170 of the fourth seam 150d to form the second linear weld 274. In some embodiments, at any time during the placement of the second stream 270 of weld-forming material, the dispenser 210 may move back and forth, or otherwise jump around, at or between any locations along the third and fourth seams 150c, 150d to ensure the desired weld geometry (e.g. cross-sectional shape) is obtained, apply multiple layers or coats to form a continuous or discontinuous second linear weld 274 or for any other purpose.

In some embodiments, at least part of the second transition weld 288 may be formed at, near or after the end of the second run, such as by the dispenser 210 dispensing weld-forming material over the second outer edge 142 of the upper panel 106 and/or the third outer edge 144 of the lower panel 108. For example, the dispenser 210 may dispense weld-forming material slightly to the right of the end 170 of the fourth seam 150d, allowing the weld-forming material to adhere to at least part of the adjacent second outer edge 142 of the upper panel 106 and the third outer edge 144 of the lower panel 108 to at least partially form (or complete) the second transition weld 288.

Still referring to FIG. 5B, if desired, the dispenser 210 may fluidly couple the second transition weld 288 (or portion thereof) to the second stream 270 of weld-forming material. For example, the dispenser 210 may, without interruption in dispensing weld-forming material 250, continue dispensing weld-forming material at the end of the second run to at least partially form (or complete) the second transition weld 288, effectively joining the exemplary second transition weld 288 with the second linear weld 274. Further, if the second transition weld 288 was already fluidly coupled or joined to the first stream 260 of weld-forming material (a/k/a the first linear weld 264) and all the streams are continuous, both the streams 260, 270 (a/k/a the linear welds 264, 274) will be merged or coupled, forming the closed-loop mat reinforcement weld 290. However, the second transition weld 288 may be formed and coupled to the first and/or second linear welds 264, 274 in any other suitable manner and at any other desired time.

It should be noted that in this exemplary embodiment, the need to form at least part of the second transition weld 288 at this time will depend upon the extent of the second transition weld 288 formed around the time of the first run. For example, if the portion of the second transition weld 288 formed at the end of the first run was substantial in size, only a small amount of weld-forming material 250 may need to be placed on the second outer edge 142 of the upper panel 106 and/or the third outer edge 144 of the lower panel 108 to complete the second transition weld 288 and couple it to the second stream 270 of weld-forming material. For another example, if essentially the entirety of the second transition weld 288 was previously formed, the weld-forming material 250 applied at the end of the second run may provide sufficient weld-forming material 250 to merge the existing second transition weld 288 with the second stream 270 of weld-forming material 250.

In other embodiments, one or more dispensers 210 may move in the opposite (clockwise) direction as suggested above (e.g. from the end 170 of the fourth seam 150*d* to the end 166 of the third seam 150*c*), from any mid-point on either seam 150*c*, 150*d*, or different dispensers 210 may move in different directions to form the second linear weld 274. In yet other embodiments, multiple dispensers 210 may simultaneously or sequentially place the second stream 270, or multiple streams, of weld-forming material 250 atop the third and fourth seams 150*c*, 150*d* and/or to at least partially form the first and second transition welds 284, 288.

Referring again to FIGS. 5A-B, in another independent aspect of the present disclosure, the reinforcement weld(s) (e.g. welds 264, 274 and/or welds 284, 288) may be formed with a specific and/or uniform or consistent geometry (e.g. thickness, cross-sectional shape, etc.) or within an acceptable range thereof, and/or have one or more other characteristics (e.g. surface finish, hardness, robustness, durability, flexibility, rigidity, water-resistance, texture, etc.) for any desired purpose. For example, in some embodiments, the reinforcement welds (e.g. welds 264, 274 and/or welds 284, 288) may be provided/formed with a specific, uniform or other desired geometry (e.g. cross-sectional shape, thickness), or within an acceptable range thereof, that will sufficiently strengthen the mat 26 at the corresponding seams 150 and/or other locations, such as to prevent the seams 150 from being a point of weakness or failure on the mat 26 during normal or expected use. In the present embodiment, each of the first and second streams 260, 270 of weld-forming material and the resulting first and second linear welds 264, 274 have a generally quarter-circular cross-sectional geometry, or shape, with a height 192 of approximately ⅝ inch and a width 194 of approximately ⅝ inch (e.g. FIGS. 16A-B). (The same weld geometry and size may likewise be used for reinforcement welds formed at any other desired locations on the mat 26.) However, this particular geometry (e.g. cross-sectional shape, thickness) and size of each stream 260, 270 and the resulting welds 264, 274 may vary depending upon the location of the weld on the mat 26, size of the mat 26, size and orientation of the panels 102, expected use of the mat 26 and/or other variables.

Similarly, in some embodiments, the transition welds (e.g. first and second transitions welds 284, 288) may be formed with a desired, specific and/or consistent geometry (e.g. thickness, cross-sectional shape, etc.) or within an acceptable range thereof to sufficiently strengthen the mat 26 at the location and prevent each such location from being a point of weakness or failure of the mat 26 during normal or expected usage, or other desired purpose. Any or all of the reinforcement welds (e.g. welds 264, 274 and/or welds 284, 288) may be formed with a uniform or other desired geometry (e.g. thickness, cross-sectional shape, etc.) to optimize the strength of the closed-loop mat reinforcement weld 290 or other desired purpose.

For another example, in some embodiments, the reinforcement welds may be provided/formed with a desired, uniform and/or specific geometry (e.g. thickness, cross-sectional shape etc.), or within an acceptable range thereof, that will sufficiently seal over the corresponding seam 150 (or other location on the mat 26) from infiltration of fluid and material. For still a further example, in some embodiments, the reinforcement welds (e.g. welds 264, 274 and/or welds 284, 288) may be provided/formed with a particular and/or uniform geometry (e.g. thickness, cross-sectional shape, etc.), surface finish or combination thereof that will provide a satisfactory or appealing aesthetic appearance of the mat 26. If desired, the welds (e.g. welds 264, 274 and/or welds 284, 288) may be formed with a substantially smooth outer surface to provide an appealing aesthetic appearance of the mat 26.

Figure 13:
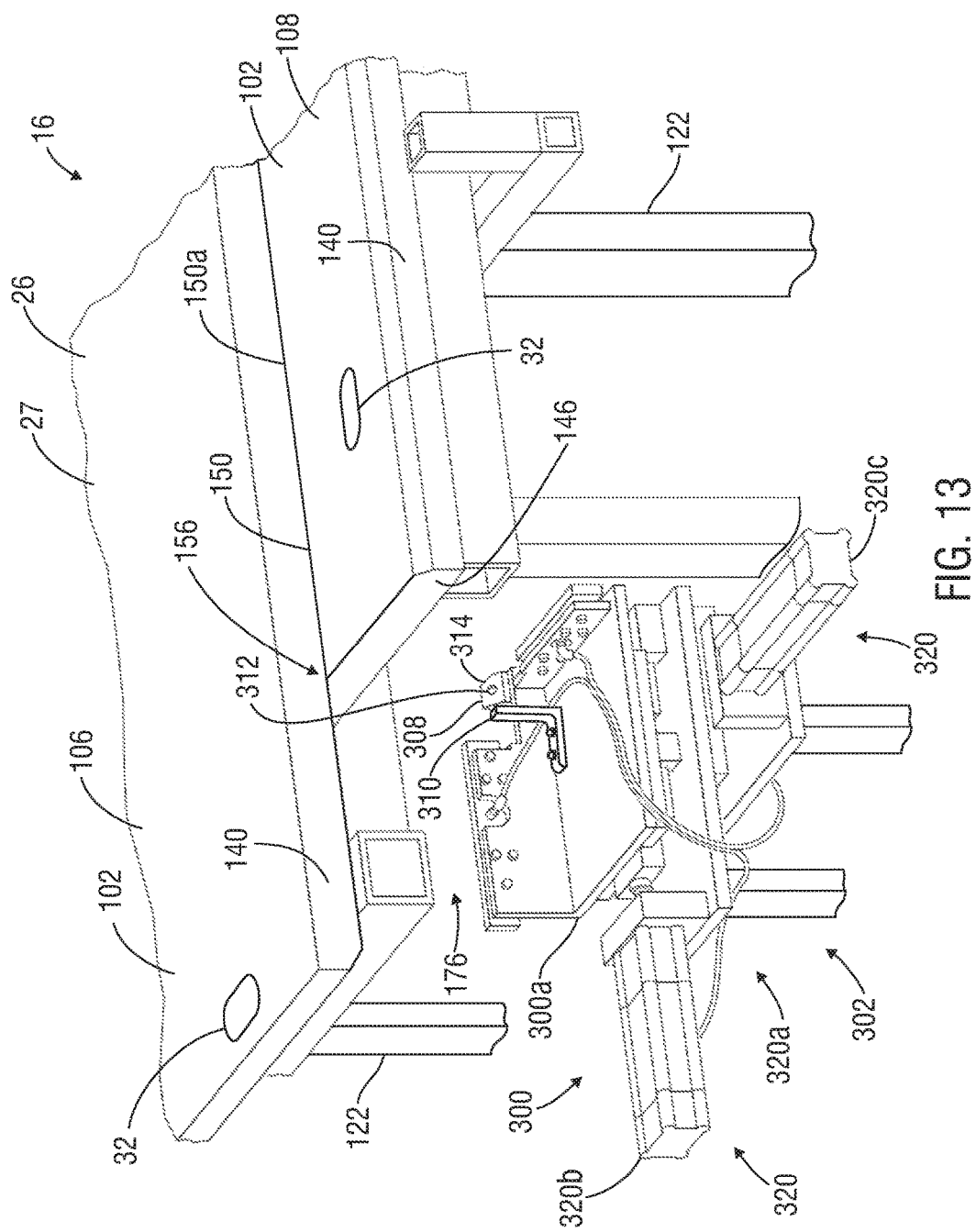
FIG. 13 is a perspective view of part of an exemplary mat along with an exemplary first forming tool before the tool is positioned adjacent to the mat in accordance with one or more embodiments of the present disclosure.

Referring to FIG. 13, in another independent aspect of the present disclosure, one or more forming tools 300 may be used assist in initiating or terminating the first and/or second streams 260, 270 of weld-forming material (e.g. FIGS. 5A-5B), forming at least part of the first and/or second transition welds 284, 288 or other desired purpose. For other examples, the forming tool(s) 300 may be used to ensure the application of weld-forming material starts or terminates at the beginning or end of the subject seam 150, the weld formed at the beginning or end of the subject seam 150 has the desired weld geometry, or a combination thereof.

The forming tool(s) 300 may have any desired form, configuration, operation and function(s). In this embodiment, a first exemplary forming tool 300*a* is useful in a corner 176 formed by the mat 26 adjacent to the end 156 of the first seam 150*a* at the beginning of the first run, a second forming tool 300*b* (e.g. FIG. 9) is useful in the corner 176 formed by the mat 26 adjacent to the end 160 of the second seam 150*b* at the end of the first run and a third forming tool 300*c* (e.g. FIG. 19A-B) is useful in the corner 176 formed by the mat 26 adjacent to the end 170 of the fourth seam 150*d* at the end of the second run. However, some embodiments or circumstances may not require use of any or all of the forming tools 300*a*, 300*b* and 300*c*. Thus, any combination of forming tools 300*a*, 300*b* and 300*c* may be used.

In this particular embodiment, a forming tool 300 is not necessary at the start of the second run, as will be described further below. However, other embodiments or circumstances may warrant use of a forming tool 300 in the corner 176 formed by the mat 26 adjacent to the end 166 of the third seam 150*c* (e.g. FIG. 5B) at the beginning of the second run. Additionally, in some embodiments, the same forming tool 300 may be configured to be useful at more than one location. Thus, the features of more than one of the forming tools 300*a*, 300*b* and 300*c* may be combined into a single forming tool 300.

Still referring to FIG. 13, in this embodiment, at least one forming tool 300 is disposed on a carrier 302. If desired, the forming tool(s) 300 or carrier(s) 301 may be mobile. For example, the forming tool(s) 300 may be selectively moveable into position relative to the mat 26 when needed and moved away from the mat 26 when not needed, such as to allow clearance when the mat 26 is flipped over or turned, or for any other desired purpose. In various embodiments, the forming tool 300 or carrier 302 may be wheeled, mounted on tracks or carried by the robotic system 216 (described below) or other component. For example, in some embodiments, the forming tool 300 or carrier 302 may be robotically actuated and moved to the desired position(s), similarly as the exemplary dispenser 210 is moved as described below. In other embodiments, the forming tool(s) 300 may be stationary.

The forming tools 300 may be selectively moveable into the desired corner 176 formed by the mat 26, or any other desired location, in any desired manner. In the present embodiment, the carriers 301 are automated for automatic positioning and movement (e.g. without human intervention or operator involvement) in the desired corner 176. For example, for precise movement and positioning of the exemplary forming tool 300 into at least partial abutting engagement with the mat 26 at the appropriate corner 176, the carrier may include one or more deployment units 320. In this embodiment, each carrier 302 includes at least one deployment unit 320a (e.g. pneumatic or hydraulic cylinder) to assist in moving the forming tool 300 vertically, at least one deployment unit 320b (e.g. pneumatic or hydraulic cylinder) to assist in moving the forming tool 300 linearly in a first substantially horizontally-oriented plane (e.g. left and right) and at least one deployment unit 320c (e.g. pneumatic or hydraulic cylinders) to assist in moving the forming tool 300 linearly in a second substantially horizontally-oriented plane (e.g. forward and backwards). The exemplary deployment units 320a-c are selectively controllable to precisely position the associated forming tool 300 when desired for use in connection with the application of weld-forming material by the dispenser(s) 210 in the exemplary multi-panel mat reinforcement process.

Still referring to FIG. 13, each exemplary forming tool 300 includes a die 308 (e.g. metal block) useful to assist in initiating or terminating one of the streams 260, 270 of weld-forming material, forming at least part of one of the transition welds 284, 288 at each location, other desired purpose or a combination thereof. The die 308 may have any suitable form, configuration and operation. In the present embodiment, the die 308 is shaped and configured to be positioned in the desired corner 176 in abutting contact with adjacent outer edges of the panels 106, 108 that form the corner (see e.g. FIG. 14). Each exemplary die 308 includes one or more cavities 314 configured to create one or more pockets 316 (e.g. FIGS. 17A-B, 18B and 19B-C) between the die 308 and at least one of the outer edges of the panels 106, 108 at the corresponding corner 176. In various embodiments, the geometry, or shape, of the cavities 314 on the dies 308 of one or more of the different forming tools 300 may be identical, similar or dissimilar, and may be located at different sides of the respective one or more forming tools 300.

The pocket 316 formed by each illustrated cavity 314 is provided to receive a desired quantity, or volume, of weld-forming material 250 from the dispenser(s) 210 to form at least part of one of the first or second transition welds 284, 288, initiate or terminate one of the streams 260, 270 of weld-forming material, other purpose or a combination thereof. Each illustrated cavity 314 is thus specifically configured and shaped to form a pocket 316 having a geometry that will achieve the desired result(s). For example, the cavity 314 may be shaped to form part of, or to complete, one of the transition welds 284, 288 and merge the corresponding stream 260, 270 of weld-forming material therewith. For other examples, the cavity 314 may be shaped to assist in initiating or terminating one of the streams 260, 270 of weld-forming material, ensuring the application of weld-forming material starts or terminates at the beginning or end of the subject seam 150, ensuring the weld formed at the beginning or end of the subject seam 150 has the desired weld geometry, or a combination thereof.

Figure 14:
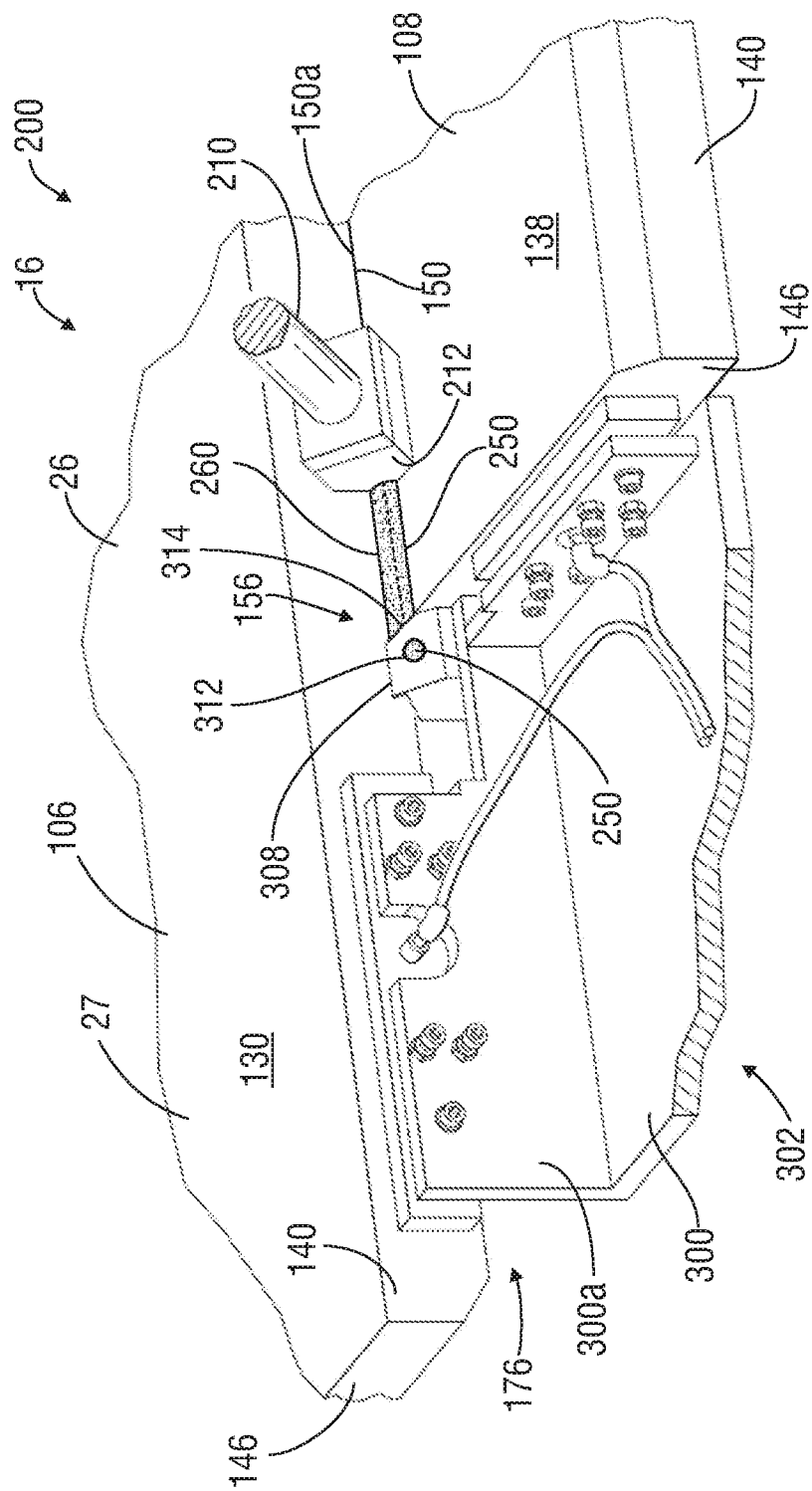
FIG. 14 is a perspective view of part of an exemplary mat and an exemplary first forming tool used therewith after at least part of a first transition weld has been formed and while a first stream of weld-forming material is being applied to the mat in accordance with one or more embodiments of the present disclosure.

Referring to FIGS. 13-14, in this embodiment, the first forming tool 300a is useful at the beginning of the first run to form at least part of the first transition weld 284 (e.g. FIG. 8) and fluidly couple it to the first stream 260 of weld-forming material 250. The illustrated first forming tool 300a is thus movable into position adjacent to the end 156 of the first seam 150a and forms a pocket 316 (FIG. 17B) between its cavity 314 and the outer edge 146 of the lower panel 108. In this embodiment, the cavity 314 of the exemplary first forming tool 300a is sized and shaped to assist in forming substantially the entire first transition weld 284 (e.g. FIG. 8) at the beginning of the first run. For example, the illustrated cavity 314 may have a generally diamond shape (e.g. FIG. 17A-B). However, the cavity 314 may have any other desired shape, configuration and purpose.

Figure 17:
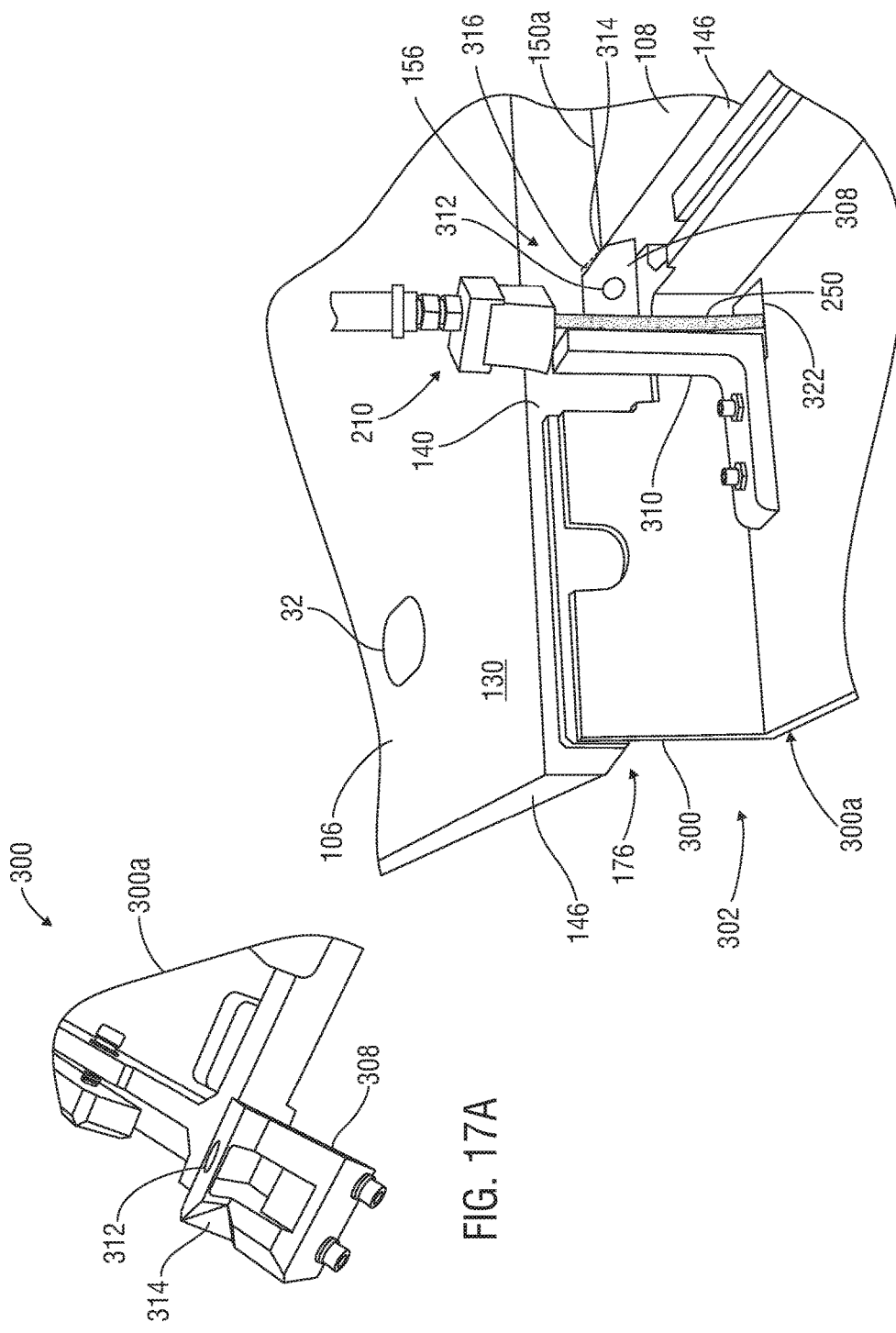
FIG. 17A is an exploded view of part of the exemplary first forming tool shown in FIG. 13 showing the exemplary die thereof in accordance with one or more embodiments of the present disclosure.
FIG. 17B is a perspective view of the exemplary first forming tool shown in FIG. 13 in position relative to the illustrated mat as the exemplary dispenser is being purged of an initial quantity of weld-forming material in accordance one or more embodiments of the present disclosure.

Referring to FIGS. 17A-B, in use of the exemplary first forming tool 300a, after the tool 300a is placed in the desired position (e.g. abutting the first outer edge 140 of the upper panel 106 and the outer edge 146 of the lower panel 108), the dispenser 210 is positioned over the pocket 316. The exemplary dispenser 210 dispenses a desired quantity of weld-forming material 250 into the pocket 316 to at least partially form the first transition weld 284. For example, the dispensed weld-forming material 250 may adhere to the outer edge 146 of the lower panel 108 (and, in some embodiments, may also adhere to the adjacent first outer edge 140 of the upper panel 106) (e.g. FIG. 8) to form at least substantially all of the first transition weld 184. In other embodiments, a smaller (or no) portion of the first transition weld 184 may be formed.

In this embodiment, without interrupting the application of weld-forming material 250, the illustrated dispenser 120 is then moved over the first seam 150a at the end 156 of the of the seam 150a and applies the first stream 260 of weld-forming material, fluidly coupling the first transition weld 284 to the first stream 260. For example, the system 200 may be configured so that the dispenser 210 will move over the first seam 150a when the pocket 316 is filled (completely or to a desired level) or resistance from the weld-forming material 250 in the pocket 316 is detected. However, other embodiments may warrant interruption of the flow of weld-forming material 250 or different sequence of events.

Referring to FIG. 17B, if desired, the first forming tool 300a may include one or more components useful to assist in initially purging the dispenser 210 of an initial quantity of weld-forming material and any hardened material (e.g. plastic), debris and contaminants attached thereto (collectively "purged material"), such as to ensure the first transition weld 284 and first stream 260 of weld-forming material 250 do not contain such unwanted materials, or other desired purpose. In this embodiment, the first forming tool 300a includes a waste material breaker 310 and/or waste purging depository 312. (It should be noted, in this embodiment, that both the exemplary breaker 310 and depository 312 are not necessary because they are used for the same purpose.)

The waste material breaker 310 and/or waste purging depository 312 may have any suitable form, configuration and operation. In this example, the waste material breaker 310 of the first forming tool 300a is an upright bar positioned to the left of the die 308 and configured so that the dispenser 210 can dispense the purged material adjacent to the breaker 310, then move over the top of the breaker 310 to sever the purged material from the weld-forming material 250 in the dispenser 210 and proceed to apply weld-forming material 250 into the pocket 316 (e.g. as described above) or elsewhere as desired. The exemplary first forming tool 300a may also include one or more purge holes 322 to allow the purged material to drop down through the tool 300a into a collection container or elsewhere.

The exemplary waste purging depository 312 in the illustrated first forming tool 300a is a hole formed in the die 308 to the left of the cavity 314 and sized to receive the purged material as it is dispensed from the dispenser 210. After depositing the purged material in the illustrated waste purging depository 312 (e.g. FIG. 14), the exemplary dispenser 210 moves sideways (e.g. to the right) and proceeds to dispense weld-forming material 250 into the pocket 316, such as described above, or elsewhere as desired. In some embodiments, the waste purging depository 312 may include one or more sufficiently sharp edges to sever, or assist in severing, the purged material from the stream of weld-forming material 250. In other embodiments, the waste material breaker 310 and/or waste purging depository 312 may have different features and locations than those described above. Further, many embodiments will include only one or the other of the material breaker 310 and waste purging depository 312, another or no component useful to assist in initially purging the dispenser 210. It should also be noted that if other forming tools 300 (e.g. forming tools 300*b*, 300*c*) include the material breaker 310 and/or water purging depository 213, such components may be positioned elsewhere on the forming tool 300 (e.g. as dictated by the direction of application of the weld forming material 250 relative to the mat 26 (e.g. to the right of the cavity 314)).

Figure 18:
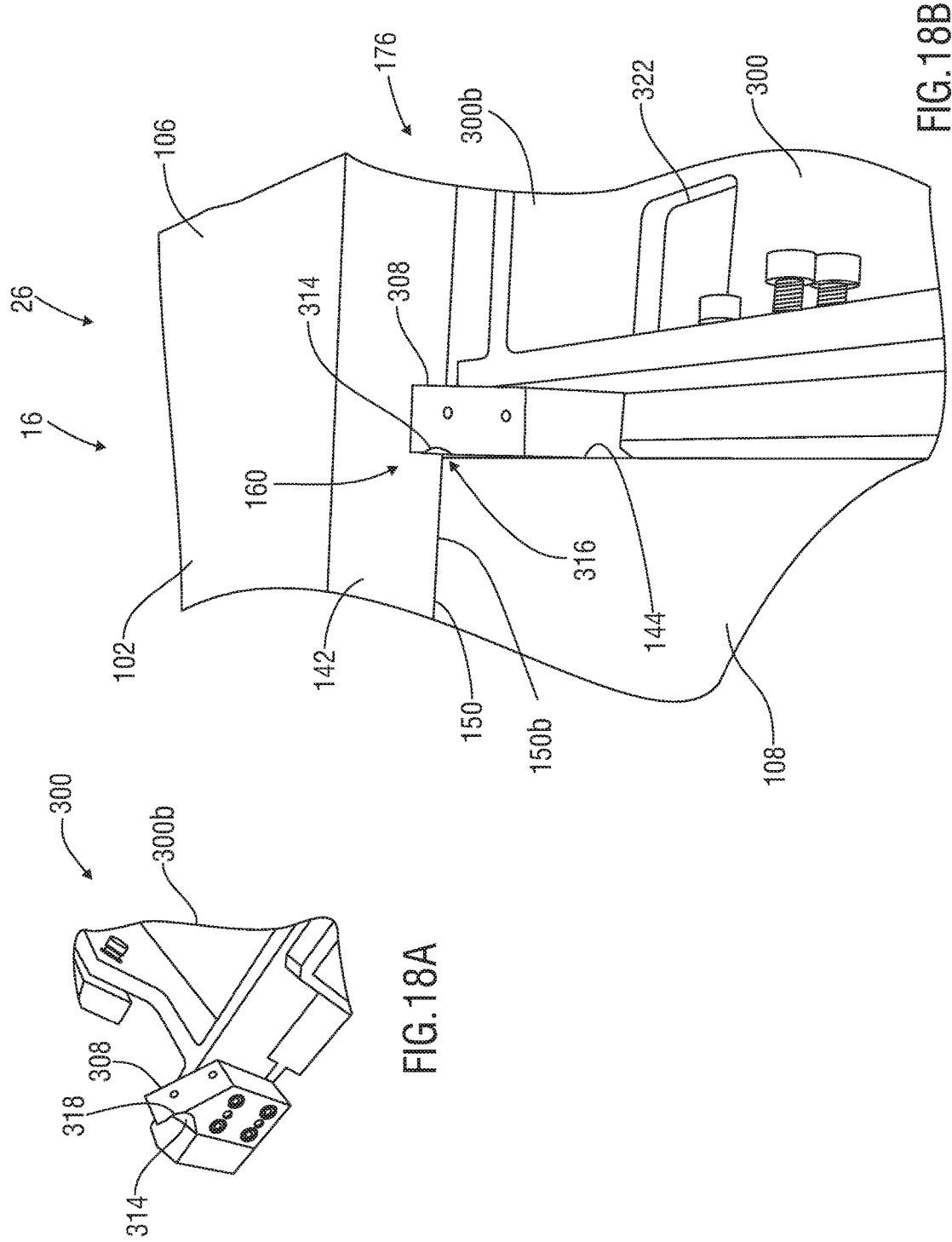
FIG. 18A is an exploded view of part of an exemplary second forming tool showing an exemplary die thereof in accordance with one or more embodiments of the present disclosure.
FIG. 18B is a perspective view of part of the exemplary second forming tool of FIG. 18A shown in position relative to an exemplary mat prior to completion of application of the first stream of weld-forming material in accordance with one or more embodiments of the present disclosure.

Now referring to FIGS. 18A-B, in this embodiment, the exemplary second forming tool 300*b* is useful at the end of the first run to form at least part of the second transition weld 288 (e.g. FIG. 5B). The illustrated second forming tool 300*b* is thus movable into position adjacent to the end 160 of the second seam 150*b* and forms a pocket 316 between its cavity 314 and the outer edge 144 of the lower panel 108. In this embodiment, the cavity 314 of the exemplary second forming tool 300*b* is sized and shaped to assist in forming at least part of the second transition weld 288 (e.g. FIG. 9) at the end of the first run. For example, the illustrated cavity 314 may have a generally half-moon shape or the same shape as the cavity 314 of the first forming tool 300. However, the cavity 314 may have any other desired shape, configuration and purpose.

In use of the exemplary second forming tool 300*b*, the tool 300*b* is placed in the desired position (e.g. abutting the outer edge 144 of the lower panel 108 and the outer edge 142 of the upper panel 106). In this embodiment, at the end of the first run, as the exemplary dispenser 210 reaches the end 160 of the second seam 150*b*, without interrupting the application of weld-forming material 250, the dispenser 210 moves directly over the pocket 316 formed between the cavity 314 and the outer edge 144 of the lower panel 108. The exemplary dispenser 210 dispenses a desired quantity of weld-forming material 250 into the pocket 316, forming at least part of the second transition weld 288 and seamlessly fluidly coupling the first stream 260 of weld-forming material 250 to the second transition weld 288. For example, the dispensed weld-forming material 250 may adhere to the outer edge 144 of the lower panel 108 (and, in some instances, may also adhere to the adjacent outer edge 142 of the upper panel 106) (e.g. FIG. 9) to form at least part of the second transition weld 288. In other embodiments, a greater, smaller or no portion of the second transition weld 288 may be formed at this time, and some embodiments may warrant interruption of the flow of weld-forming material 250.

Thereafter, in this embodiment, the exemplary dispenser 210 is configured to stop dispensing weld-forming material 250 and move away from the mat 26. For example, the system 200 may be configured so that the dispenser 210 will stop dispensing weld-forming material 250 when the pocket 316 is filled (completely or to a desired level), or resistance from the weld-forming material 250 in the pocket 316 is detected. However, in other embodiments, the dispenser 210 may continue dispending weld-forming material 250 as desired.

In some embodiments, the second forming tool 300*b* may be equipped to assist in cutting off the weld-forming material 250 after completion of the first run (and formation of at least part of the second transition weld 288). Any suitable configuration of parts may be used. For example, as shown in FIG. 18A, one or more edges 318 of the exemplary die 308 around the cavity 314 may be formed to be sharp or serrated, such as by machining or drilling a notch thereabout. In such instance, for example, the dispenser 210 may move to the right after dispensing weld-forming material 250 into the pocket 316 (and ceasing the ejection of weld-forming material) so that the last portion of dispensed weld-forming material is severed by the edge 318 of the die 308. If desired, the second forming tool 300*b* may include one or more purge holes 322 to allow the severed section of purged material to drop down through the second forming tool 300*b* into a collection container or elsewhere. In other embodiments, the second forming tool 300*b* may include a weld-forming material breaker (e.g. similar to the waste material breaker 310 described above and shown in FIG. 17B), a weld-forming material depository (e.g. similar to the purging depository 312 described above and shown in FIG. 17B) or any other useful configuration.

When desired, the second forming tool 300*b* may be moved away from the mat 26. For example, in FIG. 9, the exemplary second forming tool 300*b* is shown moving in the direction represented by arrow 304 after the completion of the second run and formation of at least part of the second transition weld 288.

Referring now to FIG. 10, in the present embodiment, at the beginning of the second run, a forming tool 300 is not necessary. For example, since the first transition weld 284 was substantially formed at the beginning of the first run, it may effectively extend close to, or at, the end 166 of the third seam 150*c* and serve as a start ledge upon which the second stream 270 of weld-forming material may begin. If so, this will eliminate the need to use a die 308 to form a pocket 316 to receive weld-forming material 250 to the left of the first outer edge 140 of the upper panel 106. Further, the first transition weld 284 previously created may, in some embodiments, still be in a state (e.g. liquid or partially liquid, molten or partially molten state) at the beginning of the second run that allows the second stream 270 of weld-forming material 250 to sufficiently fluidly fuse, or merge, therewith and/or connect thereto. Also, the use of a forming tool 300 at the beginning of the second run could risk deforming or dislodging the previously formed first transition weld 284. However, there may be circumstances in which a forming tool 300 is useful in the corner 176 formed by the mat 26 adjacent to the end 166 of the third seam 150*c* (e.g. FIG. 5B) at the beginning of the second run. If desired, such forming tool 300 may have features similar to those described and shown herein with respect to one or more of the forming tools 300*a-c*.

Figure 19:
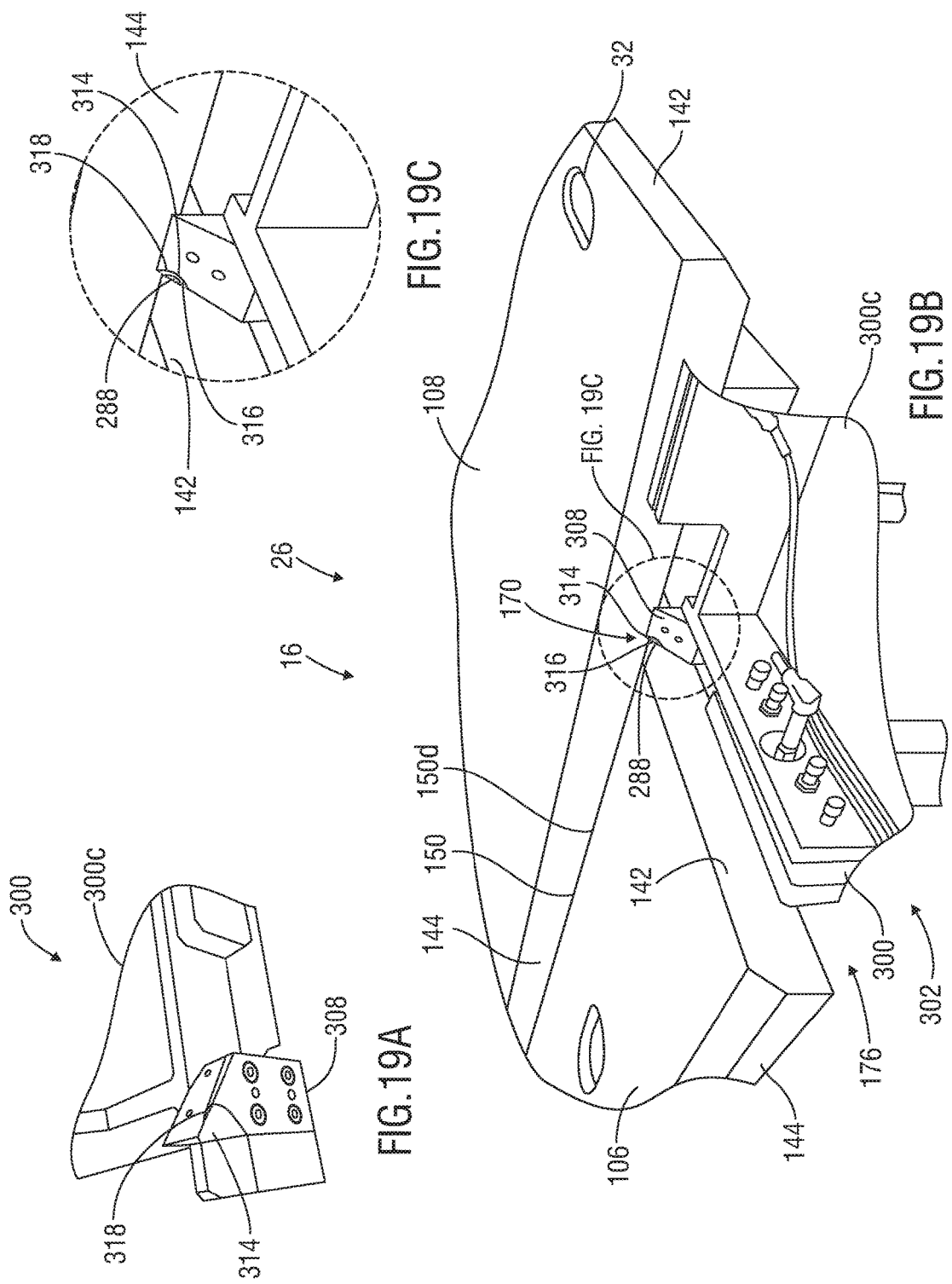
FIG. 19A is an exploded view of part of an exemplary third forming tool showing an exemplary die thereof in accordance with one or more embodiments of the present disclosure.
FIG. 19B is a perspective view of part of the exemplary third forming tool of FIG. 19A shown in position prior to completion of the application of the second stream of weld-forming material in accordance with one or more embodiments of the present disclosure.
FIG. 19C is an exploded view of the die of the exemplary third forming tool of FIG. 19B showing the pocket formed thereby and a visible portion of the previously formed exemplary second transition weld in accordance with one or more embodiments of the present disclosure.

Referring to FIGS. 19A-B, in this embodiment, the third forming tool 300*c* is useful at the end of the second run to form at least part of, or complete, the second transition weld 288 (e.g. FIG. 12) and/or merge, or couple, the second stream 270 of weld-forming material 250 with the second transition weld 288. The illustrated third forming tool 300*c* is thus movable into position adjacent to the end 170 of the fourth seam 150*d* and forms a pocket 316 between its cavity 314 and the outer edge 142 of the upper panel 106. In this embodiment, the cavity 314 of the exemplary third forming tool 300*d* is sized and shaped to assist in forming or completing at least part of the second transition weld 288 (e.g. FIG. 12) at the end of the second run. For example, the pocket 316 created by the exemplary cavity 314 may match the shape of the second transition weld 288 (formed after the first run) so that the weld-forming material provided into the pocket 316 to complete the second transition weld 288 will match the shape of and/or effectively merge with it. If desired, the illustrated cavity 314 may have the same, similar or a different shape as the cavity 314 of the first or second forming tools 300a, 300b. If desired, the cavity 314 (and pocket 316 formed thereby) of this embodiment may also be shaped so that the third forming tool 300c does not deform, or dislodge, that portion of the second transition weld 288 formed at the end of the first run. However, in other embodiments, the cavity 314 may have a different shape or purpose.

In use of the exemplary third forming tool 300c, the tool 300c is placed in the desired position (e.g. abutting the outer edge 144 of the lower panel 108 and the outer edge 142 of the upper panel 106). In this embodiment, at the end of the second run, as the exemplary dispenser 210 reaches the end 170 of the fourth seam 150d, without interrupting the application of weld-forming material 250, the dispenser 210 moves directly over the pocket 316 formed between the cavity 314 and the outer edge 142 of the upper panel 106. The exemplary dispenser 210 dispenses a desired quantity of weld-forming material 250 into the pocket 316 forming at least part of, or completing, the second transition weld 288 and fluidly coupling the second stream 270 of weld-forming material 250 to the second transition weld 288 (e.g. FIG. 5B). For example, the dispensed weld-forming material 250 may adhere to the outer edge 142 of the upper panel 106 and/or the outer edge 144 of the lower panel 108 to form at least part of, or complete, the second transition weld 288. In other embodiments, a greater, smaller or no portion of the second transition weld 288 may be formed at this stage.

Thereafter, the exemplary dispenser 210 is configured to stop dispensing weld-forming material 250 and move away from the mat 26. For example, the system 200 may be configured so that the dispenser 210 will stop dispensing weld-forming material 250 when the pocket 316 is filled (completely or to a desired level), or resistance from the weld-forming material 250 in the pocket 316 is detected. If desired, the third forming tool 300c may be equipped to assist in cutting off the weld-forming material 250 after completion of the second run (and formation of the second transition weld 288). Any suitable configuration of parts may be used. For example, as shown in FIG. 19A, one or more edges 318 of the exemplary die 308 around the cavity 314 may be formed to be sharp or serrated, such as by or machining or drilling a notch therein. In such instance, for example, the dispenser 210 may move to the right after dispensing weld-forming material 250 into the pocket 316 (and ceasing the ejection of weld-forming material) so that the last portion of dispensed weld-forming material is severed by the edge 318 of the die 308. If desired, the third forming tool 300c may include one or more purge holes 322 (e.g. FIG. 18B) to allow the severed section of purged material to drop down through the third forming tool 300c into a collection container or elsewhere. In other embodiments, the third forming tool 300c may include a weld-forming material breaker (e.g. similar to the waste material breaker 310 described above and shown in FIG. 17B), a weld-forming material depository (e.g. similar to the purging depository 312 described above and shown in FIG. 17B) or any other useful configuration. In this embodiment, when desired, the third forming tool 300c may be moved away from the mat 26.

It should be noted that, in some embodiments, weld-forming material 250 may be applied to form either or both transition welds 284, 288 partially, or entirely, with, or without, the use of one or more forming tools 300. For example, in some situations, excess weld-forming material 250 may be applied (by the dispenser(s) 210 or manually, such as with a hand-operated dispenser gun) to the respective outer edges of the panels 106, 108 where the transition welds 284, 288 are desired. Thereafter, the weld-forming material 250, or hardened transition weld 284, 288, may be shaped and/or trimmed (e.g. with a file, mill, etc.) to the desired geometry (e.g. thickness, cross-sectional shape, etc.) and/or surface finish, so that it is clean and robust, seamlessly or smoothly connects with the first and second linear welds 264, 274 to form the closed-loop mat reinforcement weld 290, or for any other desired purpose. This may be done with or without the use of one or more forming tools 300. For another example, the mat 26 or one or both panels 102 may be pre-formed with one or both transitions welds 284, 288, or include one or more features (e.g. protrusion(s) of weld material) that form one or both welds 284, 288. Thus, the transition welds 284, 288 may be integrated into the mat 26. For yet another example, the mat 26 may be pre-formed or provided with one or more weld-forming material cavities, depressions or other areas or components at the desired location(s) and configured to accept the desired quantity of weld-forming material 250 for the formation of one or both transition welds 284, 288 without the need for any forming tools 300.

Figure 15:
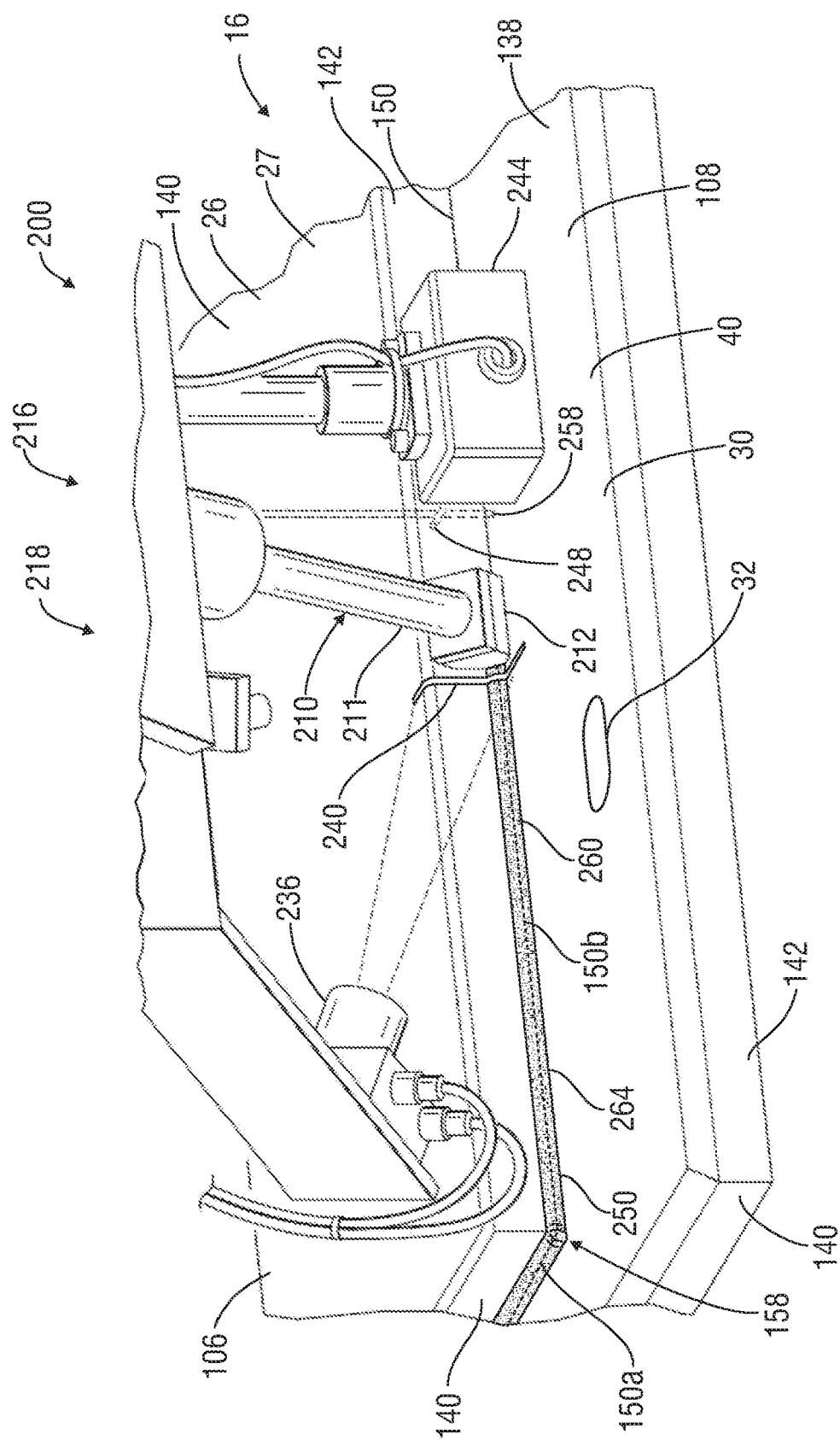
FIG. 15 is a perspective view of the mat of FIG. 14 during application of the first stream of weld-forming material with the use of an exemplary dispenser, robotic system and guidance system in accordance with one or more embodiments of the present disclosure.
Figure 16:
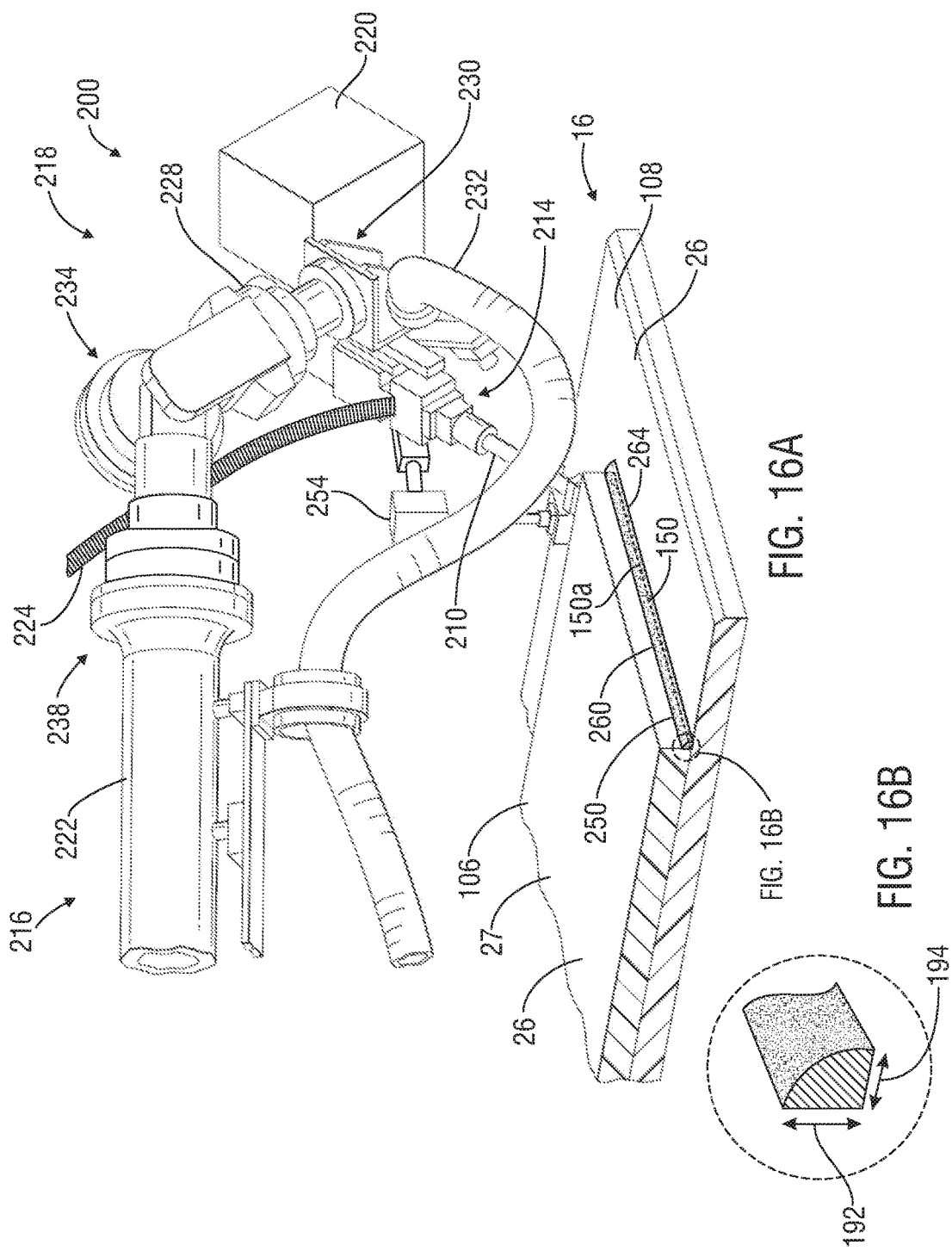
FIG. 16A is a perspective view of the mat of FIG. 15 during application of the first stream of weld-forming material to the mat in accordance with one or more embodiments of the present disclosure.
FIG. 16B is an exploded view of part of the exemplary mat of FIG. 16A showing an example geometry of the first stream of weld-forming material in accordance with one or more embodiments of the present disclosure.

Referring to FIG. 15-16A, in another independent aspect of the present disclosure, the weld-forming material dispenser(s) 210 may have any suitable form, configuration and operation. In some embodiments, the dispenser 210 may be a hand-operated dispenser gun (used during the entire or any desired part of the mat reinforcement process). For another example, the illustrated dispenser 210 is an extruder 211 that is fed molten, or semi-molten, weld-forming material (e.g. plastic) and extrudes or applies the weld-forming material under pressure. The extruder 211 may have any suitable form, configuration and operation. In this example, the extruder 211 includes a screw-type delivery system, or screw, 214 (e.g. fed via one or more feed tubes 224 from an overhead vacuum receiver). One presently commercially available device useful as the dispenser 210 in some embodiments is the DOHLE Extrusionstechnik GmbH Industrial Extruder DX292 6012 CP-3. If desired, the nozzle 212 of the extruder 211 may be constructed at least partially of Teflon or other suitable material.

The illustrated extruder 210 (e.g. the screw 214) may be powered, or driven, by one or more servo-motors 230. For example, the servo-motor(s) 230 may be used to selectively apply force to the screw(s) 214 to control and vary (e.g. in real-time) the speed the weld-forming material exits the dispenser 210. The use of the servo-motor(s) 230 for these purposes is innovative, as it applies significant force to the screw 214 and affords a high degree of precision in controlling the dispenser's rate of dispensing weld-forming material. For example, the servo-motor 230 may allow adjustment of the output of the dispenser 210 (e.g. rate, volume) in discrete steps. In one embodiment, the servo-motor 230 may allow adjustment of the output of the dispenser 210 at fifteen-degree clockwise rotational increments of the shaft of the screw 214. When a full rotation of the shaft will push exactly one cubic millimeter of weld-forming material 250 out of the dispenser 210, the output of the dispenser 210 can be controlled or varied in up to twenty-four increments of 0.042 cubic millimeters of weld-forming material each. Many other motors (e.g. traditional electric AC or DC motors and hydraulic motors) can only apply power and release power with no control over how far the shaft of the screw 214 actually spins. In such instances, the screw shaft rotates when powered and decelerates when power ceases, but the amount of weld-forming material 250 leaving the dispenser 210 is inconsistent and can vary depending upon various factors (e.g. temperature of the plastic, inertia of the shaft, duration of the power, etc.), leading to high variability and lack of precision.

The servo-motor 230 may have any suitable form, configuration and operation. In some embodiments, the servo-motor 230 may be integral to the robot 216 (e.g. as described below). For example, the servo-motor 230 may be one of the axes of the presently commercially available FANUC Robot R-2000iB220U (e.g. as described below). In other embodiments, an external servo-motor 230 may be used. One example presently commercially available external servo-motor that may be used in various embodiments of the system 200 is the FANUC αi-B series servo-motor and related equipment (see e.g. http://fanuc.co.jp/en/product/servo/f_acsm_ai.html, and http://fanuc.co.jp/en/product/catalog/pdf/servo/Servo_alphai(E)-19.pdf). However, any other suitable arrangement of components may be used. Furthermore, the present disclosure is not limited to the above details and example dispensers 210 and features thereof.

The dispenser(s) 210 be selectively controlled to dispense weld-forming material (e.g. in the first and second streams 260, 270 and/or to form the first and second transition welds 284, 288) in any suitable manner and with any suitable equipment. If desired, the dispenser(s) 210 may be automated so that manual operation of the dispenser 210 is not (or minimally) necessary. For example, the movement of, and ejection of weld-forming material from, the dispenser 210 may be computer, or electronically controlled. Referring to FIG. 16A, in the present embodiment, the one or more dispensers 210 are carried on and moved by one or more robots, or robotic systems, 216 controlled by one or more guidance systems 218 (see also FIG. 6). However, various embodiments may involve partial or complete manual operation of the dispenser(s) 210 and/or other components provided herein, or additional components.

The robotic system 216 and guidance system 218 may have any suitable form, configuration, components and operation. For example, in some embodiments, the robotic system 216 and/or guidance system 218 may include any of the components of the presently commercially available FANUC Robot R-2000iB220U (see e.g. http://www.fanuc.eu/fi/en/robots/robot-filter-page/r-2000-series/r-2000ib-220u), Fanuc iRVision (see e.g. http://robot.fanucamerica.com/products/vision-software/robot-vision-software.aspx.), Yaskawa Motoman line (see e.g. https://www.motoman.com/products/vision/default) and/or SICK (UK) LTD PLR Model PLR-3210111, Part No. 1058779 (see e.g. https://www.sick.com/gb/en/system-solutions/robot-guidance-systems/plr/plr-3210111/p/p300545). In this embodiment, the robotic system 216 includes at least one robotic arm 222 (e.g. FIG. 16B) and is configured for precise control of the position, movement and operation of the dispenser 210 during the multi-panel mat reinforcement process, such as to provide each reinforcement weld with a uniform, consistent or otherwise desired geometry or other purpose. For example, the robotic system 216 may include multiple axes of rotation (or other action(s)) to enable precise movement and positioning of the dispenser 210. In the illustrated embodiment, the robotic system 216 is a multi-axis machine having multiple, interconnected, articulating, robotic arms 222 (or segments of a single arm 222) and a distinct servo-motor (e.g. servo-motors 230, 234, 238) at each axis to provide multiple axes of movement (or other action(s)), of the dispenser 210. For example, the system 216 may include seven axes of movement, each having a dedicated servo-motor. In other embodiments, the system 216 may have one, two, three, four, five, six, eight or more axes of movement to provide any desired number of axes of movement or other actions. In this embodiment, a hose 232 is provided for containing various wires and cables.

The exemplary robotic system 216 may also include one or more force-feedback units, or force sensors, 228 configured to sense resistance in, or forces applied to, one or more axes of movement of the dispenser 210 and/or other component(s) (e.g. robotic arm 222 or segment thereof) of the robotic system 216. The force sensor 228 may have any suitable form, configuration and operation. One presently commercially available force sensor useful in some embodiments of the present disclosure is the FANUC FS-15iA force sensor (see e.g.http://robot.fanucamerica.com/robotics-articles/force-sensors-in-robot-applications.aspx). If desired, the force sensor 228 may measure resistance in multiple, or all, axes of movement of the desired component. For example, the force-feedback unit 228 may be configured to measure back-pressure resistance, push and/or pull on the dispenser 210 (or one or more robotic arms 222 or segments thereof). This may be useful, for example, to control the linear speed of the dispenser 210, assist in determining if the dispenser 210 is too close or far from the mat 26 and/or dispensing too much or little weld-forming material in real-time as the dispenser 210 reinforces the mat 26, so that corrective adjustments may be made to maintain the desired position of, and supply of weld-forming material from, the dispenser 210, obtain the desired weld geometry or any other desired purpose. However, the present disclosure is not limited to these particular components. The robotic system 216 may have any other suitable components and functions.

Referring to FIGS. 15-16A, the exemplary guidance system 218 includes a controller, or control unit, 220 which dictates the movement and operation of the robotic system 216 and dispenser(s) 210. The control unit 220 may have any suitable form, configuration, operation and components. In this embodiment, the control unit 220 receives information (e.g. real-time) from the force sensor(s) 228 (when included). If desired, the exemplary guidance system 218 may also or instead receive information (e.g. real-time) from one or more measuring instruments (e.g. measuring instruments 236, 244 and 254) regarding the position of the dispenser 210, one or more characteristics of the applied weld-forming material 250 (e.g. geometry, contour) or other feature. For example, the position of the dispenser 210 and/or rate the weld-forming material 250 is dispensed therefrom may be adjusted by the control unit 220 to accommodate for imperfections (e.g. bulges or depressions, curves) in or around the seam(s) 150 of the mat 26 and/or outer edge(s) of the panels 102 being reinforced.

If desired, the control unit 220 may control the servo-motor 230 in order to precisely control the speed of the screw system 214 (e.g. every rotation of the screw), allowing precise control of the output (e.g. rate, quantity) of weld-forming material from the dispenser 210. In the present embodiment, the control unit 220 is a PLC (programmable logic controller), as is and become further known. One example of a presently commercially available controller 220 that can be used in some embodiments of the system 200 is the FANUC SYSTEM R-30iB Controller (see e.g. http://robot.fanucamerica.com/products/controls/Images/R-30iB%20Controller%20Product%20Information_179.pdf). However, any other suitable type of control unit 220 may be used.

The measuring instruments may have any suitable form, configuration and operation. In the present embodiment, the measuring instruments 236, 244 and 254 are laser units which use laser technology, as is and becomes further known. In other embodiments, the measuring instruments 236, 244 and 254 may use radar, acoustic, sonar, optical, LVDT, linear encoder, whisker switch proximity technology or other compatible active and/or passive measurement acquisition technology for the desired purpose. In the illustrated embodiment, a first measuring instrument 236 emits at least a first reflective signal (e.g. reflected laser beam) 240 onto the mat 26 behind the dispenser 210, such as to measure the quality (e.g. geometry, height, contour) of the weld-forming material applied by the dispenser 210. As used herein, the terms "reflective signal" and variations thereof as used in the context of the measuring instrument(s) may include signals provided and/or received or otherwise generated or processed by active and/or passive measuring instruments, including, for example, contact-type measurement acquisition (e.g. whisker switches, LVDTs, linear encoders, etc.) and/or non-contact-type measurement acquisition (e.g. sonar, light, acoustic, etc.), and which provide useful feedback to the guidance and/or robotic systems 218, 216. This information may be useful, for example, by the control unit 220 to dictate or modify the rate and/or volume of ejection of weld-forming material from the dispenser 210, or other desired purpose. The second and third exemplary measuring instruments 244, 254 emit respective reflective signals (e.g. reflected laser beams) 248, 258 onto the mat 26, such as to measure the distance between the dispenser 210 and the respective adjacent surfaces of the panels 106, 108. In this embodiment, the second measuring instrument 244 emits at least the second reflective signal 248 onto the associated outer edge (140, 142, 144 or 146) of one panel 102 adjacent to the seam 150 forward of the exemplary dispenser 210, and the third measuring instrument 254 emits at least third reflective signal 258 onto the inner face 138 of the other panel 102 adjacent to the seam 150 forward of the exemplary dispenser 210.

Depending upon the embodiment and situation, the information gathered by the controller 220 may be useful by the controller 220, for example, to dictate or change the position of the dispenser 210, rate and/or volume of ejection of weld-forming material 250 from the dispenser 210, or a combination thereof, in order to obtain the desired geometry (e.g. thickness, cross-sectional shape, etc.) of the reinforcement weld(s) (e.g. welds 264, 274, 284, 288), or other desired purpose. For example, the system 200 may be able to avoid the application of too much weld-forming material 250 that could cause the resulting weld to bow outwardly and/or avoid the application of too little weld-forming material 250 that could cause a depression in the weld, in either case creating a potential point of failure of the mat 26, fluid leakage through or by the applied weld, unacceptable appearance or other undesirable result. For another example, in some embodiments, it may be desirable to precisely maintain the distance between the nozzle 212 of the dispenser 210 and the mat 26, such as to avoid contact between the nozzle 211 and the mat 26 (e.g. which could affect the weld geometry or weaken or damage the resulting weld). However, the present disclosure is not limited to these particular components. The guidance system 218 may have any other suitable components and functions.

The application of weld-forming material 250 to form a desired weld geometry around corners (e.g. corners 158, 168 (e.g. FIGS. 5A-B)) on the mat 26, such as a geometry (e.g. thickness, cross-sectional shape, etc.) that is consistent with the other portions of the subject weld (e.g. welds 264, 274), is believed to sometimes be particularly difficult. The robotic system 216 and/or guidance system 218 of this embodiment may be configured or programmed to cause the dispenser(s) 210 to apply the weld-forming material 250 around the subject corners (e.g. corners 158, 168) to the desired weld geometry (e.g. thickness, cross-sectional shape, etc.). In fact, in some embodiments, the dispenser 210 may apply the weld-forming material 250 around the corners 158, 168 with the desired geometry (e.g. thickness, cross-sectional shape, etc.) without interrupting the application of weld-forming material across the subject seam(s) 150.

It should be understood that the present disclosure is not limited to forming first and second linear welds 264, 274 and first and second transition welds 284, 288 on the mat 26. Welds can be formed using the multi-panel mat reinforcement methods and/or the above components at any desired location(s) on the mat 26. Further, in various embodiments, any or all of the above-mentioned components (e.g. dispenser 210, robot 216, robotic arm(s) 222, guidance system 218, controller 220, feed tube(s) 224, force-feedback unit(s) 228, servo-motor(s) 230, measuring instruments (e.g. units 236, 244, 254), forming tools 300, etc.) and/or any other components of the multi-panel mat reinforcement system 200, may be automated and/or may operate in conjunction with one or more other such components with little or no human or operator intervention or participation. Likewise, any or all parts of the multi-panel mat reinforcement methods of the present disclosure may be performed with little or no human or operator intervention or participation. However, in some embodiments, human or operator intervention or participation may be used at any desired stage.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods described above or claimed herein and any other methods which may fall within the scope of the appended claims can be performed in any desired or suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of any appended claims, and may be made and used by one of ordinary skill in the art without departing from the spirit or teachings of the invention and scope of this disclosure and any appended claims. Thus, all matter herein set forth or shown in the accompanying drawings should be interpreted as illustrative, and the scope of the disclosure and any appended claims should not be limited to the embodiments described and shown herein.

The invention claimed is:

1. A system useful for reinforcing a support mat over at least one seam formed between upper and lower panels of the mat, the upper and lower panels having similar or dissimilar shapes and dimensions, the system comprising:
   at least one extruder configured to apply weld-forming material over the at least one seam to form at least one weld atop the at least one seam;
   at least one electronic controller associated with said at least one extruder and configured to control and vary the rate and/or quantity of output of weld-forming material from said at least one extruder;
   at least one measuring instrument electronically coupled to said at least one electronic controller, said at least one measuring instrument being configured to emit a series of reflective signals onto the mat, retrieve at least some of the reflective signals and communicate data relating thereto to said at least one electronic controller; and
   at least one force sensor associated with said at least one extruder and electronically coupled to said at least one electronic controller, said at least one force sensor being configured to measure one or more forces placed upon, or caused by, said at least one extruder during use of the system and communicate data relating thereto to said at least one electronic controller,
   whereby said at least one electronic controller is configured to determine whether corrective adjustments need to be made to the rate and/or quantity of output of weld-forming material from said at least one extruder based at least partially upon data received from said at least one measuring instrument and/or said at least one force sensor and, if so, determine the desired corrective adjustment(s) and cause such corrective adjustment(s) to be made to the rate and/or quantity of output of weld-forming material from said at least one extruder.

2. The system of claim 1 wherein said at least one extruder is configured to be stationary relative to the mat and the mat is moveable relative to said at least one extruder during use of the system.

3. The system of claim 1 wherein said at least one extruder is configured to move relative to the mat while applying weld-forming material thereto.

4. The system of claim 1 wherein said at least one extruder is electronically-controlled and configured to apply weld-forming material over the at least one seam under pressure without human intervention or operator involvement.

5. The system of claim 1 wherein said at least one electronic controller is a programmable logic controller.

6. The system of claim 1 wherein said at least one extruder includes at least one nozzle configured to be positioned closest to the mat during use of the system, said at least one nozzle being constructed at least partially of Teflon.

7. The system of claim 1 wherein the path of the at least one seam of the mat includes at least one corner, further wherein said at least one electronic controller is configured to cause said at least one extruder to apply the weld-forming material in one or more continuous, uninterrupted streams over the at least one corner of the at least one seam.

8. The system of claim 1 wherein said at least one measuring instrument is a laser unit.

9. The system of claim 1 wherein said at least one measuring instrument uses at least one among radar, sonar, optical and whisker switch proximity technology.

10. The system of claim 1 wherein at least one said measuring instrument is configured to emit at least one reflective signal onto the mat behind said at least one extruder to measure the geometry of the weld-forming material applied to the mat by said at least one extruder.

11. The system of claim 1 wherein at least one said measuring instrument is configured to emit at least one reflective signal onto at least one surface of the upper panel of the mat adjacent to the at least one seam and forward of said at least one extruder to measure the distance between said at least one extruder and the upper panel, further wherein said at least one electronic controller is configured to vary the position of said at least one extruder relative to the mat and/or the rate and/or quantity of output of weld-forming material from said at least one extruder based at least partially upon measurements received from said at least one measuring instrument.

12. The system of claim 1 wherein at least one said measuring instrument is configured to emit at least one reflective signal onto at least one surface of the lower panel of the mat adjacent to the at least one seam and forward of said at least one extruder to measure the distance between said at least one extruder and the lower panel, further wherein said at least one electronic controller is configured to vary the position of said at least one extruder relative to the mat and/or the rate and/or quantity of output of weld-forming material from said at least one extruder based at least partially upon measurements received from said at least one measuring instrument.

13. The system of claim 1 wherein said at least one force sensor is configured to measure at least one among back-pressure resistance caused by said at least one extruder and push and pull on said at least one extruder during use of the system.

14. The system of claim 1 further including at least one robot carrying said at least one extruder and being electronically coupled to said at least one electronic controller, said at least one robot being configured to control and vary the rate and/or quantity of output of weld-forming material from said at least one extruder, wherein said at least one electronic controller is configured to direct said at least one robot to make the desired corrective adjustment(s) to the rate and/or quantity of output of weld-forming material from said at least one extruder.

15. A system for reinforcing a support mat over at least one seam formed between upper and lower panels of the mat, the upper and lower panels having similar or dissimilar shapes and dimensions, the system comprising:
   at least one extruder configured to apply weld-forming material over the at least one seam to form at least one weld atop the at least one seam, each said extruder including at least one screw configured to feed weld-forming material through said at least one extruder to the mat;
   at least one servo-motor coupled to at least one said screw and configured to selectively apply force to rotate said at least one screw and control the rate said at least one screw feeds weld-forming material through said at least one associated extruder;
   at least one electronic controller associated with said at least one servo-motor and configured to dictate the amount of force applied to said at least one screw by said at least one servo-motor to control the rate and/or quantity of output of weld-forming material from said at least one extruder; and
   at least one measuring instrument electronically coupled to said at least one electronic controller, said at least one measuring instrument being configured to emit a series of reflective signals onto the mat, retrieve at least some of the reflective signals and communicate data relating thereto to said at least one electronic controller, wherein said at least one electronic controller is configured to determine whether corrective adjustments need to be made to the rate and/or quantity of output of weld-forming material from said at least one extruder based at least partially upon data received from said at least one measuring instrument and, if so, determine the desired corrective adjustment(s) and cause such corrective adjustment(s) to be made to the rate and/or quantity of output of weld-forming material from said at least one extruder.

16. The system of claim 15 further including at least one force sensor associated with said at least one extruder and electronically coupled to said at least one electronic controller, said at least one force sensor being configured to measure one or more forces placed upon, or caused by, said at least one extruder during use of the system and communicate data relating thereto to said at least one electronic controller, wherein said at least one electronic controller is configured to determine whether corrective adjustments need to be made to the rate and/or quantity of output of weld-forming material from said at least one extruder based at least partially upon data received from said at least one force sensor and, if so, determine the desired corrective adjustment(s) and cause such corrective adjustment(s) to be made to the rate and/or quantity of output of weld-forming material from said at least one extruder.

17. The system of claim 15 further including at least one robot carrying said at least one extruder and each said at least one servo-motor and being electronically coupled to said at least one electronic controller, said at least one robot being configured to dictate the amount of force applied to said at least one screw by said at least one servo-motor to control the rate and/or quantity of output of weld-forming material from said at least one extruder, wherein said at least one electronic controller is configured to direct said at least one robot to make the desired corrective adjustment(s) to the rate and/or quantity of output of weld-forming material from said at least one extruder.

18. A system for providing a reinforcement weld over and/or proximate to at least one seam formed between upper and lower panels of a support mat, the upper and lower panels having similar or dissimilar shapes and dimensions, the system comprising:
at least one extruder configured to apply weld-forming material over and/or proximate to the at least one seam to form at least one weld atop and/or proximate to the at least one seam; and
at least one forming tool positionable adjacent to the support mat and configured to assist in (a) initiating or terminating the application of weld-forming material atop the at least one seam by said at least one extruder and/or (b) applying weld-forming material to the mat proximate to the at least one seam by said at least one extruder, said at least one forming tool including a first cavity configured to form a first pocket between said forming tool and at least part of at least one of the panels and adjacent to the at least one seam, said first pocket being formed to have a geometry that accepts a desired quantity of weld-forming material from said at least one extruder at the beginning or end of the application of weld-forming material over and/or proximate to the at least one seam by said at least one extruder.

19. The system of claim 18 wherein each panel includes at least one outer edge and each seam has a beginning disposed proximate to or on at least one outer edge of each panel and an end disposed proximate to or on at least one outer edge of each panel, further wherein said at least one forming tool includes at least a first die, said first die including said first cavity, wherein said first die is configured so that said first pocket created by said first cavity possesses a geometry that accepts weld-forming material of sufficient quantity to form at least part of a transition weld on the outer edge of at least one of the panels adjacent to the beginning and/or end of the at least one seam.

20. The system of claim 19 wherein said at least one extruder is configured to apply weld-forming material over and proximate to the at least one seam, further wherein said first die is configured to allow said at least one extruder to fluidly couple the transition weld to the weld-forming material applied over the at least one seam.

21. The system of claim 18 wherein said at least one forming tool is automated, mobile and configured to selectively position said first cavity proximate to at least one of the panels without human intervention or operator involvement.

22. The system of claim 18 wherein said at least one forming tool includes a first deployment unit configured to assist in moving said first cavity up and down, a second deployment unit configured to move said first cavity in a first horizontal plane and a third deployment unit configured to move said first cavity in a second horizontal plane that differs from the first horizontal plane.

23. The system of claim 18 further including at least one electronic controller associated with said at least one extruder and configured to control and vary the rate and/or quantity of output of weld-forming material from said at least one extruder.

24. The system of claim 23 further including at least one measuring instrument electronically coupled to said at least one electronic controller, said at least one measuring instrument being configured to emit a series of reflective signals onto the mat, retrieve at least some of the reflective signals and communicate data relating thereto to said at least one electronic controller, wherein said at least one electronic controller is configured to determine whether corrective adjustments need to be made to the rate and/or quantity of output of weld-forming material from said at least one extruder based at least partially upon data received from said at least one measuring instrument and, if so, determine the desired corrective adjustment(s) and cause such corrective adjustment(s) to be made to the rate and/or quantity of output of weld-forming material from said at least one extruder.

25. The system of claim 23 further including at least one force sensor associated with said at least one extruder and electronically coupled to said at least one electronic controller, said at least one force sensor being configured to measure one or more forces placed upon, or caused by, said at least one extruder during use of the system and communicate data relating thereto to said at least one electronic controller, wherein said at least one electronic controller is configured to determine whether corrective adjustments need to be made to the rate and/or quantity of output of weld-forming material from said at least one extruder based at least partially upon data received from said at least one force sensor and, if so, determine the desired corrective adjustment(s) and cause such corrective adjustment(s) to be made to the rate and/or quantity of output of weld-forming material from said at least one extruder.

26. The system of claim 23 further including at least one robot carrying said at least one extruder and being electronically coupled to said at least one electronic controller, said at least one robot being configured to control and vary the rate and/or quantity of output of weld-forming material from said at least one extruder.

27. An automated system for providing a reinforcement weld over at least one seam formed between upper and lower panels of a support mat, the upper and lower panels having similar or dissimilar shapes and dimensions, the automated system comprising:
- at least one extruder configured to move along the mat and apply weld-forming material atop the at least one seam of the mat to form at least one weld atop the at least one seam;
- at least one automated robot configured to carry said at least one extruder and control the movement and position of said at least one extruder relative to the mat;
- at least one controller electronically coupled to said at least one robot and configured to direct said at least one robot to (a) position and move said at least one extruder relative to the mat as desired and (b) control the rate said at least one extruder applies weld-forming material atop the at least one seam; and
- at least one measuring instrument electronically coupled to said at least one controller, said at least one measuring instrument configured to emit a series of reflective signals onto the mat and retrieve at least some of the reflective signals to measure at least one among the position of said at least one extruder relative to the mat and one or more characteristics of the weld-forming material applied to the mat by said at least one extruder and communicate such data to said at least one controller,
- wherein said at least one controller is configured to receive data from said at least one measuring instrument and determine, based upon such data, whether said at least one robot should make one or more corrective adjustments to at least one among the position of said at least one extruder, the speed of movement of said at least one extruder and the rate of application of weld-forming material from said at least one extruder to the mat and, if so, determine the desired corrective adjustment(s) and direct said at least one robot to make such corrective adjustment(s).

28. The automated system of claim 27 wherein the path of the at least one seam of the mat includes at least one corner, further wherein said controller is configured to cause said at least one extruder to apply the weld-forming material in one or more continuous, uninterrupted streams over the at least one corner of the at least one seam.

29. An automated system for providing a reinforcement weld over at least one seam formed between upper and lower panels of a support mat, the upper and lower panels having similar or dissimilar shapes and dimensions, the automated system comprising:
- at least one extruder configured to apply weld-forming material over the at least one seam to form at least one weld atop the at least one seam;
- at least one automated robot configured to carry said at least one extruder and control the rate said at least one extruder applies weld-forming material atop the at least one seam;
- at least one controller electronically coupled to said at least one robot and configured to direct said at least one robot to vary and/or maintain the rate said at least one extruder applies weld-forming material atop the at least one seam; and
- at least one force sensor associated with said at least one extruder and electronically coupled to said at least one controller, said at least one force sensor being configured to measure at least one among back-pressure resistance caused by said at least one extruder and push and pull on said at least one extruder during use of the system and communicate such data to said at least one controller,
- wherein said at least one controller is configured to receive data from said at least one force sensor and determine, based upon such data, whether said at least one extruder is too close or too far from the mat and/or dispensing too much or too little weld-forming material as said at least one extruder reinforces the mat, and whether said at least one robot needs to make corrective adjustments to at least one among the position of said at least one extruder, the speed of movement of said at least one extruder and the rate of application of weld-forming material from said at least one extruder to the mat and, if so, determine the corrective adjustment(s) and direct said at least one robot to make such corrective adjustment(s).

30. The system of claim 15 wherein the path of the at least one seam of the mat includes at least one corner, further wherein said at least one electronic controller is configured to cause said at least one extruder to apply the weld-forming material in one or more continuous, uninterrupted streams over the at least one corner of the at least one seam.

31. The system of claim 30 wherein said at least one extruder is electronically-controlled and configured to apply weld-forming material over the at least one seam under pressure without human intervention or operator involvement.

32. The automated system of claim 27 wherein said at least one extruder is electronically-controlled and configured to apply weld-forming material over the at least one seam under pressure without human intervention or operator involvement.

33. The automated system of claim 27 wherein said at least one measuring instrument is a laser unit.

34. The automated system of claim 33 wherein at least one said measuring instrument is configured to emit at least one reflective signal onto the mat behind said at least one extruder to measure the geometry of the weld-forming material applied to the mat by said at least one extruder.

35. The automated system of claim 33 wherein at least one said measuring instrument is configured to emit at least one reflective signal onto at least one surface of the upper panel of the mat adjacent to the at least one seam and forward of said at least one extruder to measure the distance between said at least one extruder and the upper panel, further wherein said at least one electronic controller is configured to vary the position of said at least one extruder relative to the mat and/or the rate and/or quantity of output of weld-forming material from said at least one extruder based at least partially upon measurements received from said at least one measuring instrument.

36. The automated system of claim 33 wherein at least one said measuring instrument is configured to emit at least one reflective signal onto at least one surface of the lower panel of the mat adjacent to the at least one seam and forward of said at least one extruder to measure the distance between said at least one extruder and the lower panel, further wherein said at least one electronic controller is configured to vary the position of said at least one extruder relative to the mat and/or the rate and/or quantity of output of weld-forming material from said at least one extruder based at least partially upon measurements received from said at least one measuring instrument.

37. A system for reinforcing a support mat over at least one seam formed between upper and lower panels of the mat, the upper and lower panels having similar or dissimilar shapes and dimensions, the system comprising:
   at least one extruder configured to apply weld-forming material over the at least one seam to form at least one weld atop the at least one seam, each said extruder including at least one screw configured to feed weld-forming material through said at least one extruder to the mat;
   at least one servo-motor coupled to at least one said screw and configured to selectively apply force to rotate said at least one screw and control the rate said at least one screw feeds weld-forming material through said at least one associated extruder;
   at least one electronic controller associated with said at least one servo-motor and configured to dictate the amount of force applied to said at least one screw by said at least one servo-motor to control the rate and/or quantity of output of weld-forming material from said at least one extruder; and
   at least one force sensor associated with said at least one extruder and electronically coupled to said at least one electronic controller, said at least one force sensor being configured to measure one or more forces placed upon, or caused by, said at least one extruder during use of the system and communicate data relating thereto to said at least one electronic controller, wherein said at least one electronic controller is configured to determine whether corrective adjustments need to be made to the rate and/or quantity of output of weld-forming material from said at least one extruder based at least partially upon data received from said at least one force sensor and, if so, determine the desired corrective adjustment(s) and cause such corrective adjustment(s) to be made to the rate and/or quantity of output of weld-forming material from said at least one extruder.

38. The system of claim 37 wherein said at least one extruder is electronically-controlled and configured to apply weld-forming material over the at least one seam under pressure without human intervention or operator involvement.

* * * * *